United States Patent
Bito

(10) Patent No.: US 7,530,597 B2
(45) Date of Patent: May 12, 2009

(54) AIRBAG DEVICE FOR FRONT PASSENGER'S SEAT

(75) Inventor: Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 332 days.

(21) Appl. No.: 11/167,263

(22) Filed: Jun. 28, 2005

(65) Prior Publication Data

US 2006/0006633 A1  Jan. 12, 2006

(30) Foreign Application Priority Data

Jul. 6, 2004 (JP) ............................. 2004-199694
Jul. 9, 2004 (JP) ............................. 2004-203233

(51) Int. Cl.
*B60R 21/16* (2006.01)
(52) U.S. Cl. .................................... 280/742; 280/743.1
(58) Field of Classification Search ................. 280/729, 280/740, 743.1, 728.2, 742, 732
See application file for complete search history.

(56) References Cited

U.S. PATENT DOCUMENTS

| 5,172,933 | A | * | 12/1992 | Strasser ...................... 280/740 |
| 5,573,270 | A | * | 11/1996 | Sogi et al. ..................... 280/740 |
| 5,927,748 | A | * | 7/1999 | O'Driscoll ................... 280/729 |
| 5,951,038 | A | * | 9/1999 | Taguchi et al. .............. 280/729 |
| 6,022,046 | A | * | 2/2000 | Isomura et al. .......... 280/743.2 |
| 6,361,067 | B1 | * | 3/2002 | Varcus et al. ................ 280/729 |
| 6,382,662 | B1 | * | 5/2002 | Igawa ......................... 280/729 |
| 6,398,258 | B2 | * | 6/2002 | Hamada et al. .......... 280/743.1 |
| 6,598,903 | B2 | * | 7/2003 | Okada et al. ............. 280/743.2 |
| 6,648,366 | B2 | * | 11/2003 | Dillon et al. ................. 280/729 |
| 6,682,093 | B2 | * | 1/2004 | Tajima et al. ............... 280/732 |
| 7,264,268 | B2 | * | 9/2007 | Ehrke ......................... 280/729 |

FOREIGN PATENT DOCUMENTS

| GB | 2265118 A | * | 9/1993 |
| JP | A-05-042855 | | 2/1993 |
| JP | A-2002-029361 | | 1/2002 |

* cited by examiner

*Primary Examiner*—John Q. Nguyen
*Assistant Examiner*—Joseph Rocca
(74) *Attorney, Agent, or Firm*—Posz Law Group, PLC

(57) ABSTRACT

The airbag device for front passenger's seat of the present invention includes an airbag protruding and deploying from an opening for protrusion in instrument panel in front of front passenger's seat when activated. The airbag includes a bag-shaped airbag body constituting outer wall of the airbag, and a flow regulating cloth disposed inside the airbag body. The flow regulating cloth inflates firstly upon inflow of inflation gas, and redirects the gas before supplying the same to the airbag body for promoting deployment of the airbag body. The flow regulating cloth includes a circumferential wall provided with left and right gas outlet ports for emitting gas outward in left and right directions. When the airbag is inflated, parts of the circumferential wall of the left and right outlet ports project from the opening in instrument panel in left-right direction, such that the parts deploy above top face of the instrument panel in a periphery of the opening. The airbag device of the present invention stably suppresses partial protrusion of the airbag toward front passenger's seat in the initial stage of inflation.

5 Claims, 32 Drawing Sheets

AIRBAG DEVICE FOR FRONT PASSENGER'S SEAT

The present application claims priority from Japanese Patent Application No. 2004-199694 of Bito, filed on Jul. 6, 2004, and Japanese Patent Application No. 2004-203233 of Bito, filed on Jul. 9, 2004, the disclosures of which are hereby incorporated into the present application by reference.

BACKGROUND OF THE INVENTION

1. Field of the Invention

The present invention relates to an airbag device for vehicle which develops and inflates an airbag for protecting an occupant.

2. Description of Related Art

In the prior art, Japanese Patent Laid-Open No. 2002-029361, especially in paragraph No. 0019 and FIG. 9, discloses an airbag device for front passenger's seat including a flow regulating cloth in an airbag body. When inflation gas flows in an airbag, in this airbag device, the flow regulating cloth helps inflate the airbag body while directing gas outward in left-right direction. Accordingly, the airbag body completes inflation while being developed widely in left-right direction, without unnecessarily protruding toward a passenger.

In conventional airbag devices for front passenger's seat, however, a flow regulating cloth has a band shape extending vertically, and its width is the same as transverse width of an opening of a case. The case is adapted to accommodate and hold a folded airbag and an inflator for supplying the airbags with gas. The flow regulating cloth is joined to upper and lower edges of an opening of the case at upper and lower ends of the band shape thereof.

This means that transverse dimension of the flow regulating cloth is short. Because of this, in an initial stage of inflation of the airbag body, the flow regulating cloth emits inflation gas into the airbag body before protruding from the case and completing inflation. In other words, this is not a gas flow into the airbag body in a state in which the flow regulating cloth is protruded from an instrument panel in front of front passenger's seat and is completely inflated. Accordingly, the flow regulating cloth cannot easily supply inflation gas outward in left-right direction, i.e., to the airbag body. In other words, even if the flow regulating cloth still in the case emits inflation gas to the airbag body, a portion of the airbag body protruded from instrument panel is not developed widely in left-right direction. Consequently, in conventional airbag devices for front passenger's seat, there is a room for improvement in suppressing partial protrusion of the airbag toward front passenger's seat in the initial stage of inflation.

In the prior art, moreover, Japanese Patent Laid-Open No. 5-042855 discloses an airbag device for vehicle which deploys an airbag for protecting an occupant. This airbag is provided with an auxiliary bag in an airbag body. This auxiliary bag inflates at first and redirects gas before supplying the same to the airbag body for promoting deployment of the airbag body. In this kind of airbag device, when fed with inflation gas, the auxiliary bag inflates firstly, and then the airbag body completes inflation with inflation gas flowing out of the auxiliary bag.

However, in the airbag device in the prior art, when the airbag is folded for accommodation in a housing, the airbag body and auxiliary bag are folded together from flattened multi-ply state.

With this construction, since the auxiliary bag cannot complete inflation and development before unfolding of the airbag body, the auxiliary bag does not deploy swiftly. As a result, in the airbag device in the prior art, there is a room for improvement in the auxiliary bag's redirecting and supplying a great deal of inflation gas in predetermined directions for promoting inflation of the airbag body.

As a countermeasure against this problem, it is conceivable to increase output of an inflator. However, employing a high-output inflator may increase internal pressure of an airbag in the initial stage of inflation, which is not suitable when the airbag is likely to engage an occupant in the initial stage of airbag inflation.

SUMMARY OF THE INVENTION

A first invention of the present application contemplates to solve the above-mentioned problem, and has an object to provide an airbag device for front passenger's seat capable of stably suppressing partial protrusion of an airbag toward front passenger's seat in the initial stage of inflation.

A second invention of the present application also contemplates to solve the above-mentioned problem, and has an object to provide an airbag device capable of developing an airbag swiftly in a wide range while suppressing increase of internal pressure of the airbag in the initial stage of inflation.

The airbag device for front passenger's seat of the first invention of the present application includes an airbag protruding and deploying from an opening for protrusion in instrument panel in front of front passenger's seat when fed with inflation gas. The airbag includes a bag-shaped airbag body constituting outer wall of the airbag, and a flow regulating cloth located upstream of inflation gas inside the airbag body. The flow regulating cloth inflates firstly upon inflow of inflation gas, and redirects the gas before supplying the same to the airbag body for promoting deployment of the airbag body. The flow regulating cloth includes a circumferential wall provided with left and right gas outlet ports for emitting gas outward in left and right directions. When the airbag is inflated, parts of the circumferential wall of the left and right outlet ports project from the opening in instrument panel in left-right direction, such that the parts deploy above top face of the instrument panel at least in left and right peripheries of the opening.

In the airbag device for front passenger's seat of the first invention, the flow regulating cloth is inflated by inflation gas firstly in the initial stage of airbag inflation. At this time, the circumferential walls of the left and right outlet ports for supplying inflation gas to left and right sides of the airbag body are so projected left and rightwards from the opening of the instrument panel as to be located above top face of the instrument panel in the left and right peripheries of the opening. Accordingly, when the cloth completes inflation, the left and right outlet ports are disposed above the top face of the instrument panel in the left and right peripheries of the opening, so that the left and right outlet ports emit inflation gas left and rightwards, i.e., outward in a free space out of the instrument panel, in the airbag body. As a result, the cloth securely helps develop the airbag body in the initial stage of inflation widely left and rightwards.

Therefore, the airbag device for front passenger's seat of the first invention stably suppresses partial protrusion of the airbag toward front passenger's seat in the initial stage of inflation, and protects a passenger smoothly with the airbag even if the passenger is seated close to the instrument panel and moves over in the initial stage of inflation.

The abovementioned supply of inflation gas to the airbag body is performed when the flow regulating cloth is completely inflated. Accordingly, even if the airbag body is folded up in a different way, the cloth develops the airbag body widely left and rightwards without being affected by the difference of the folding method.

The flow regulating cloth may be formed into a pipe shape provided with the left and right gas outlet ports in left and right ends thereof, and a gas inlet port in generally transverse center of the circumferential wall.

With this construction, the flow regulating cloth is formed into a pipe shape easily by joining both edges of a generally rectangular plate shaped cloth member, for instance. Therefore, the flow regulating cloth is manufactured easily.

In this case, the flow regulating cloth may be constructed such that inner diameter in the vicinity of the inlet port is greater than that in the vicinity of the left and right outlet ports.

With this construction, a top face side of the pipe-shaped circumferential wall extends along left-right direction, when the airbag is inflated. Accordingly, the cloth stably supplies inflation gas emitted out of the left and right outlet ports along top face of the instrument panel, and along left-right direction to the airbag body.

The flow regulating cloth may be constructed to include a pipe-shaped surface side portion and a pipe-shaped inlet side portion. The surface side portion is provided with the left and right gas outlet ports in left and right ends thereof, and is disposed above top face of the instrument panel upon inflation of the airbag. The inlet side portion for admitting inflation gas is perpendicularly communicated with the surface side portion at generally transverse center of a circumferential wall of the surface side portion.

With this construction, when the flow regulating cloth inflates in initial stage of inflation of the airbag, the surface side portion projects on top face of the instrument panel with the left inlet port and the right inlet port arranged straightly. Accordingly, inflation gas flown from the inlet side portion is divided in left-right direction at generally transverse center of the surface side portion, and stably emitted to reverse directions, i.e. in left and right directions, from the left and right outlet ports. Consequently, the flow regulating cloth secures wide development of the airbag body in left-right direction in the initial stage of inflation.

The flow regulating cloth may include an auxiliary outlet port between the left outlet port and the right outlet port in the circumferential wall for emitting inflation gas to a direction perpendicular to left-right direction. The airbag device thus constructed develops the airbag body widely in vertical direction etc. as well as in transverse direction with inflation gas emitted from the auxiliary ports.

The auxiliary port may be located in a position toward which the airbag protrudes, in the parts of the circumferential walls of the left and right outlet ports projected above top face of the instrumental panel. With the auxiliary port thus constructed, reaction force caused by inflation gas emitted out of the auxiliary port applies to the circumferential walls, so that axial direction of the circumferential wall stably extends along left-right direction. As a result, stream direction of inflation gas flowing left and rightwards from the left and right outlet ports is further stabilized.

It will also be appreciated to construct the flow regulating cloth such that each of projecting lengths in left-right direction of the leading end parts of the circumferential walls of the left and right outlet ports projected above top face of the instrument panel is a length that end faces of circumferential walls of the left and right outlet ports do not abut against inner surface of the completely inflated airbag body, and that the length is ⅕ of transverse width of the opening for protrusion in the instrument panel or longer.

With this arrangement, when the airbag inflates, the flow regulating cloth stably supplies inflation gas left and rightwards, i.e., outward, to the airbag body from the left and right outlet ports without being blocked by a wall of the airbag body. Moreover, each of the projecting lengths of leading ends of the circumferential walls of the left and right outlet ports is ⅕ of transverse width of the opening for protrusion or longer, which is not too short. Accordingly, the flow regulating cloth stably supplies inflation gas to left and right parts of the airbag body from the left and right outlet ports.

Moreover, it will be appreciated to construct the flow regulating cloth as follows: when the airbag is completely inflated, a portion confronting the gas inlet port is disposed above top face of the instrument panel; and the flow regulating cloth has, provided that height from the inlet port to the opening for protrusion is H0, and that height from the inlet port to the portion confronting the inlet port is H1, such inner diameter that relationship between H0 and H1 is H0<H1<3×H0.

This construction does not unnecessarily protrude the airbag rearward from rear face of the instrument panel in the initial stage of inflation. Consequently, the airbag reduces pressure applied to an occupant approaching the instrument panel in the initial stage of airbag inflation.

An airbag device according to the second invention of the present application includes a folded and housed airbag inflatable with inflation gas for protecting an occupant. The airbag includes a bag-shaped airbag body constituting outer wall of the airbag, and an auxiliary bag. The auxiliary bag located upstream of inflation gas inside the airbag body inflates firstly upon inflow of inflation gas, and redirects the gas before supplying the same to the airbag body for promoting deployment of the airbag body.

In a section taken along deployment direction of the airbag from upstream side portion of inflation gas in folded and housed state, the auxiliary bag includes an upstream portion, a downstream portion, and a joining portion that joins the upstream portion and the downstream portion, of inflation gas, respectively. The joining portion is disposed around a fold mass of the airbag body, without being folded into folds of the fold mass, so that the joining portion joins the upstream portion and downstream portion generally straightly. The downstream portion is arranged generally perpendicularly to the joining portion in a flat two-ply state, and is laid out to contact back face of a wall portion of the airbag body which is located ahead in deployment direction of the airbag.

In the airbag device of the second invention, when the folded and housed airbag deploys with inflation gas, inflation gas flows from the upstream portion of the auxiliary bag to the downstream portion via the joining portion, and thus inflates the upstream portion, the joining portion and the downstream portion in order. At this time, the joining portion joins the upstream portion and the downstream portion generally straightly, without being folded into folds of the fold mass of the airbag body. Accordingly, the joining portion is not affected by unfolding of the fold mass, but inflation gas is instantly supplied to the downstream portion from the upstream portion to complete inflation of the auxiliary bag. Consequently, the completely inflated auxiliary bag supplies a great deal of inflation gas to the airbag body, so that the airbag body is developed swiftly in the initial stage of inflation.

Moreover, when the airbag is housed in vehicle, the downstream portion of the auxiliary bag is developed flatly in two-ply state, and is arranged to contact back face of the wall portion of the airbag body which is located ahead in deployment direction of the airbag. When the airbag body is inflated, accordingly, the portion contacting the downstream portion of the auxiliary bag is pushed and deploys quickly and widely. Due to this and swift development by inflation gas emitted out of the outlet ports of the completely inflated auxiliary bag, the airbag body swiftly increases its volume in the initial stage of inflation, which prevents increase of internal pressure of the airbag body in the initial stage of inflation. As a result, the airbag protects an occupant with its cushioning property, even if the airbag engages the occupant in the initial stage of inflation.

Therefore, the airbag device of the second invention develops the airbag quickly in a wide range while suppressing increase of internal pressure of the airbag in the initial stage of inflation, so that the device protects an occupant coming close even if the occupant is seated close to an airbag housing.

If a portion of the folded and housed airbag body whose back face contacts with the downstream portion of the auxiliary bag is a face for protecting an occupant upon deployment of the airbag, it is desired that the joining portion of the auxiliary bag is located between two fold masses of the folded and housed airbag body, and that the downstream portion of the auxiliary bag is disposed over both outer surfaces of the two fold masses.

With this construction, the wide portion of the airbag body for protecting an occupant, which is disposed over outer surfaces of the two fold masses, is swiftly inflated to secure thickness in deployment direction. Consequently, the airbag securely protects the occupant even if it engages him in the initial stage of inflation.

Moreover, since the joining portion of the auxiliary bag is located between the two fold masses, inflation gas to flow from the upstream portion to the downstream portion via the joining portion is guided in between the masses toward the downstream portion straightly. As a result, direction of inflation gas is stabilized, so that the portion of the airbag body contacting the downstream portion stably deploys with no error from airbag to airbag.

Furthermore, since the joining portion of the auxiliary bag is located between the two fold masses, the joining portion pushes out the two fold masses due to inflation of itself, so that development of the masses is promoted.

This construction of the airbag may be applied to an airbag for front passenger's seat mounted on top face of instrument panel in front of front passenger's seat and deploying rearward of vehicle. In this case, the auxiliary bag has a cylindrical shape extending in left-right direction, and comprises a gas inlet port in transverse center in a lower side thereof. The airbag is desirably constructed as follows: when the airbag is folded and housed, in a section taken along front-rear direction of the inlet port, the gas upstream portion is a lower circumferential wall, the downstream portion is an upper circumferential wall, of the auxiliary bag, respectively, and the joining portion is circumferential walls confronting in front-rear direction between the upper and lower circumferential walls. Two fold masses of the airbag body are located in front and rear of the joining portion, respectively, and a front fold mass is bellows-folded while a rear fold mass is roll-folded downward and forward from a rear edge thereof.

With this construction, when the auxiliary bag is inflated by inflation gas from the gas inlet port in the initial stage of inflation of the airbag, the portion where the downstream portion of the auxiliary bag is located inflates for protecting a passenger. In addition, inflation gas flows outward in left-right direction from the outlet ports to inflate the airbag body in left-right direction above the top face of the instrument panel. Accordingly, the airbag body developed widely in left-right direction securely protects the passenger (seated in front passenger's seat) seated close to the instrument panel in the initial stage of inflation. Moreover, since the rear fold mass is roll-folded downward and forward, in the course of unfolding, the rear fold mass is developed along top face of the instrument panel while inflating, and smoothly enters into a narrow gap between the rear face of the instrument panel and the passenger seated close to the instrument panel.

In this auxiliary bag for the airbag for front passenger's seat, it is desired that, when the airbag is completely inflated, an upper end portion confronting the gas inlet port and left and right openings (or outlet ports) are located above top face of the instrument panel, and that transverse length of the auxiliary bag is smaller than transverse dimension of the completely inflated airbag body, and is greater than transverse dimension of the completely folded-up airbag. With this construction, the auxiliary bag promotes unfolding of the airbag body during development of itself in the initial stage of inflation. Moreover, after completing inflation, the auxiliary bag supplies inflation gas to the airbag body smoothly without left and right openings' (outlet ports) being interfered with by the instrument panel or the airbag body.

The construction that the joining portion of the auxiliary bag is located between the two fold masses of the folded and housed airbag body may be applied to an airbag for driver's seat mounted in a boss of steering wheel in front of driver's seat and deploying rearward of vehicle. In this case, the auxiliary bag is formed into a cylindrical shape extending in front-rear direction, and includes a gas inlet port in longitudinal center in a lower side thereof. When the airbag is folded and housed, in a section taken along left-right direction of the inlet port, the gas upstream portion is a lower circumferential wall, the downstream portion is an upper circumferential wall, of the auxiliary bag, respectively, and the joining portion is circumferential walls confronting in left-right direction between the upper and lower circumferential walls, and the two fold masses of the airbag body are located in left and right of the joining portion, respectively.

With this construction, when the auxiliary bag is inflated by inflation gas from the inlet port in the initial stage of inflation of the airbag, the portion where the downstream portion of the auxiliary bag is located inflates for protecting the driver. Meanwhile, inflation gas flows out of the outlet ports in front and rear directions, so that the airbag body inflates above the boss of steering wheel elongatively in front-rear direction. As a result, the airbag smoothly deploys between abdomen of an occupant, which engages the airbag in initial stage of inflation, and a ring of steering wheel, even if the occupant (or a driver) is seated close to the steering wheel. Although the airbag is elongate in front-rear direction in the initial stage of inflation, its transverse width is reduced. Accordingly, the airbag does not strongly press left and right arms of the driver holding the ring.

If this airbag device for driver's seat includes a pad for covering the folded airbag in the boss of steering wheel, and the pad includes a door to be pushed open by the inflated airbag, the auxiliary airbag is desirably constructed as follows: when the airbag is completely inflated, an upper end portion confronting the inlet port, and front and rear openings (or outlet ports) of the auxiliary bag are disposed above the pad with the door opened, and is disposed above top face of a ring of the steering wheel for holding in steering. In addition, length of the auxiliary bag in front-rear direction is smaller than dimension of the completely inflated airbag body in front-rear direction, and greater than dimension of the completely folded-up airbag in front-rear direction. With this construction, the auxiliary bag promotes unfolding of the airbag body during development of itself in the initial stage of inflation. Moreover, after completing inflation, the auxiliary bag supplies inflation gas to the airbag body smoothly without front and rear openings' (outlet ports) being interfered with by the door of the pad, the ring of steering wheel, or the airbag body.

The airbag device of the second invention of the present application may be applied to a side impact airbag device mounted on a seat. This side impact airbag device includes an airbag, and inflator, and an airbag cover. The airbag is folded and housed in a side of back rest of a seat, and is deployable forward of vehicle to be located at side of a seated occupant when completely inflated. The inflator is housed inside the airbag, and includes gas discharge ports in upper and lower ends thereof. The airbag cover is attached to the back rest for covering the housed airbag, and is pushed and opened by the inflating airbag for providing an opening for the airbag to protrude from. The airbag includes an airbag body and two auxiliary bags. The airbag body is inflated forward into a generally rectangular plate shape extending from rear edge thereof where the inflator is housed. Each of the auxiliary bags is formed into a cylindrical shape extending vertically and is mounted around the gas discharge ports of the inflator at upper and lower ends of the inflator. The upstream portion is a portion proximate to the gas discharge ports, and the downstream portion is a portion proximate to leading end, of the auxiliary bag, respectively. The airbag is bellows-folded such that front edge thereof is brought closer to rear edge thereof, and then is folded forward at upper and lower ends of the bellows-folded portion. In the auxiliary bag mounted around upper and lower ends of the inflator, the joining portion is located in upper and lower end faces of the completely folded-up airbag body, and the downstream portion is located in a front end face of the completely folded-up airbag body.

With this construction, when inflation gas is discharged from the gas discharge ports of the inflator, the joining portion is not affected by folds of the fold masses, but the auxiliary bag instantly supplies inflation gas to the downstream portion from the upstream portion, via the joining portion, since the joining portion is located straightly in upper and lower end faces of the completely folded-up airbag body, and the downstream portion is located in the front end face of the completely folded-up airbag body. Then the auxiliary bag which was bent in L-shape rotates the downstream portion and the joining portion around upper/lower part of the inflator, so that the auxiliary bag inflates in a rod shape extending vertically from the inflator. At this time, the airbag quickly opens the door of the airbag cover, and the front edge of the airbag body which was bellows-folded to the rear edge is pulled out forward from the opening. Accordingly, the airbag body deploys a part of the front edge swiftly at vehicle's outer side of the occupant while suppressing internal pressure in the initial stage of inflation. Moreover, with inflation gas flowing out of the downstream portions of the upper and lower auxiliary bags, the airbag body smoothly protrudes forward while unfolding entirely, and completes development and inflation at side of the occupant.

Especially, the upper and lower auxiliary bags are disposed to encircle the airbag body within the airbag body, from the rear end face of the folded airbag body to the front end face via the upper and lower end faces. That is, although the airbag body is compactly folded up with its up-down and front-rear dimensions reduced and housed in the back rest, the auxiliary bags help develop and inflate the airbag body swiftly.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
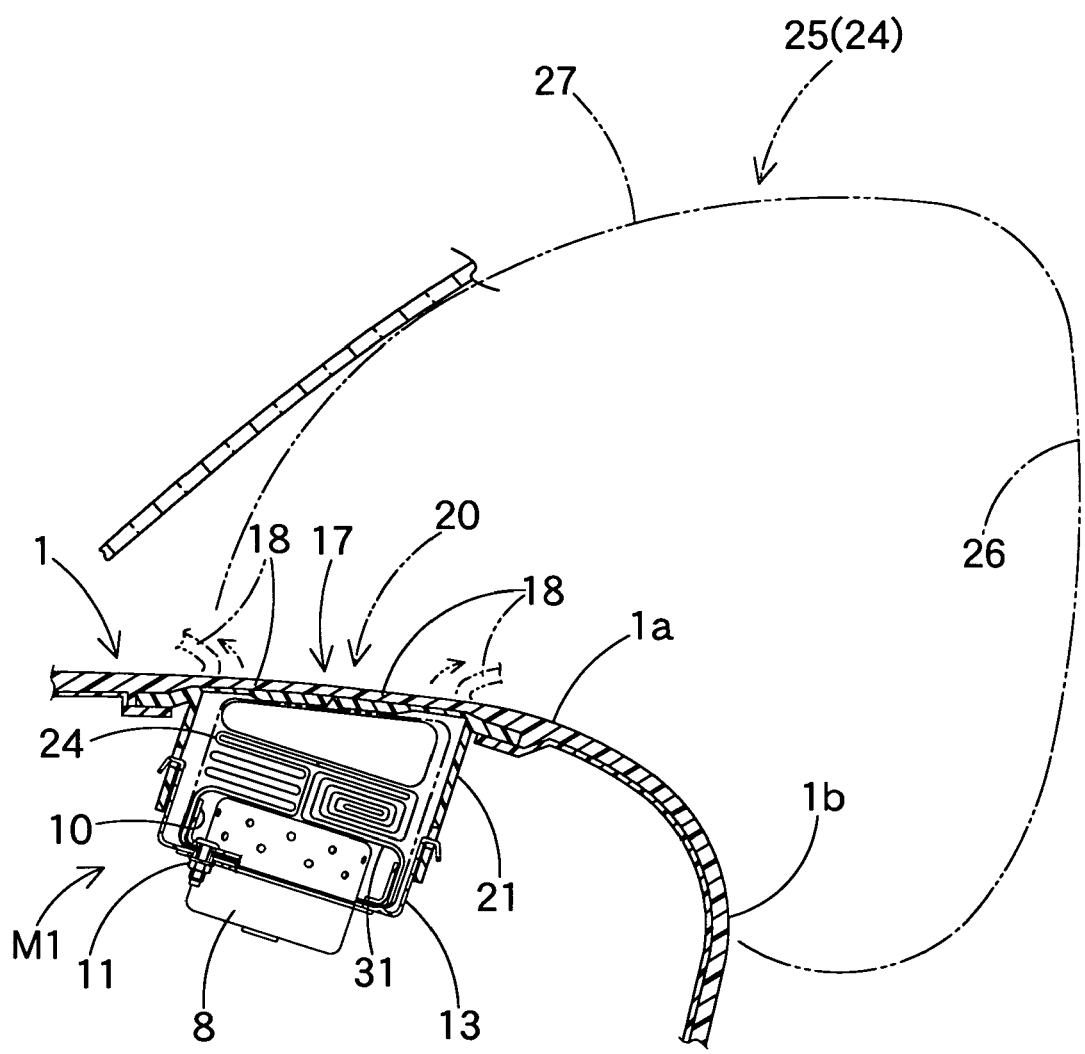
FIG. 1 is a schematic vertical section of an airbag device for front passenger's seat according to a first embodiment of the present invention in service, taken along front-rear direction of vehicle.
Figure 2:
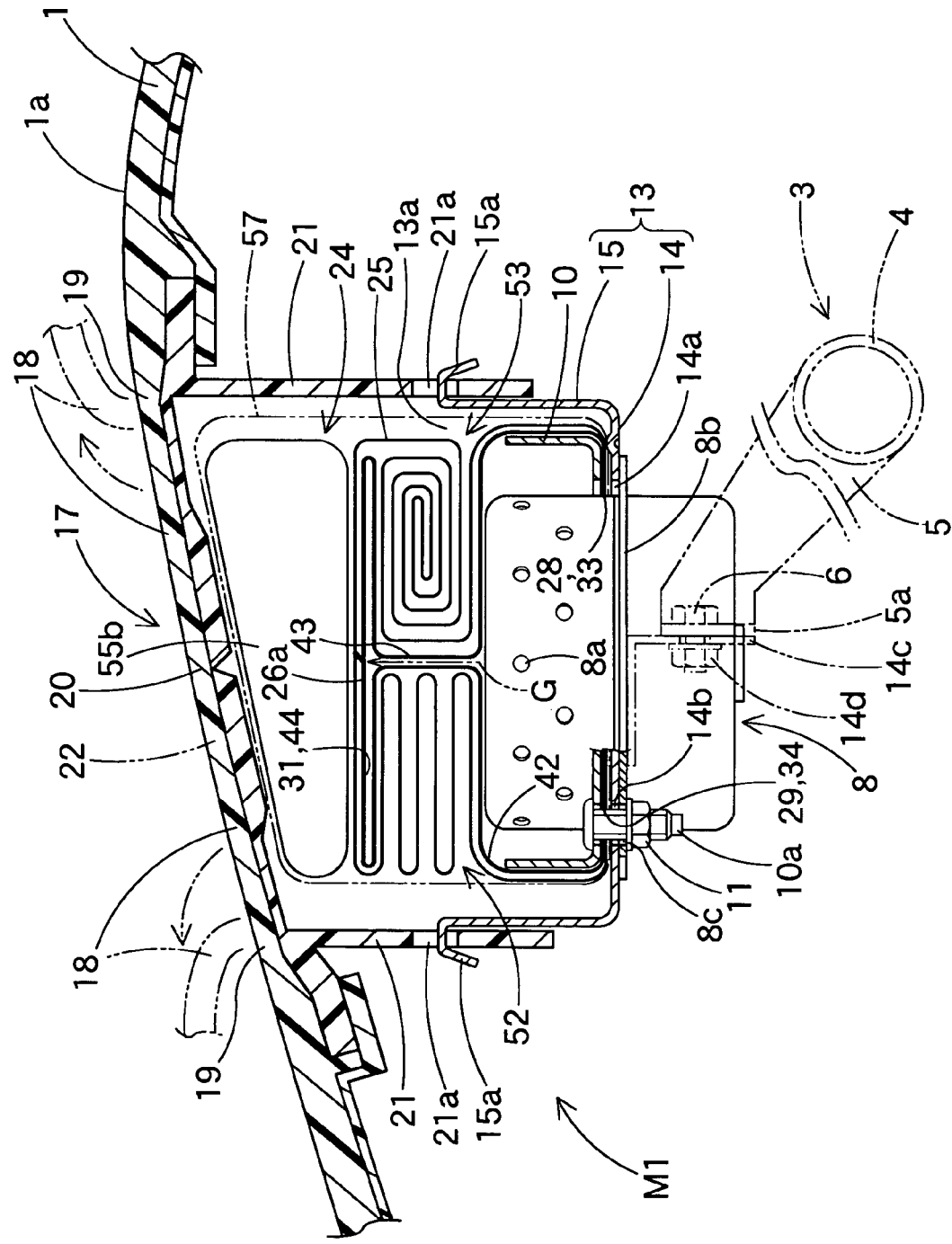
FIG. 2 is a schematic vertical section of the airbag device of FIG. 1, taken along front-rear direction of vehicle.
Figure 3:
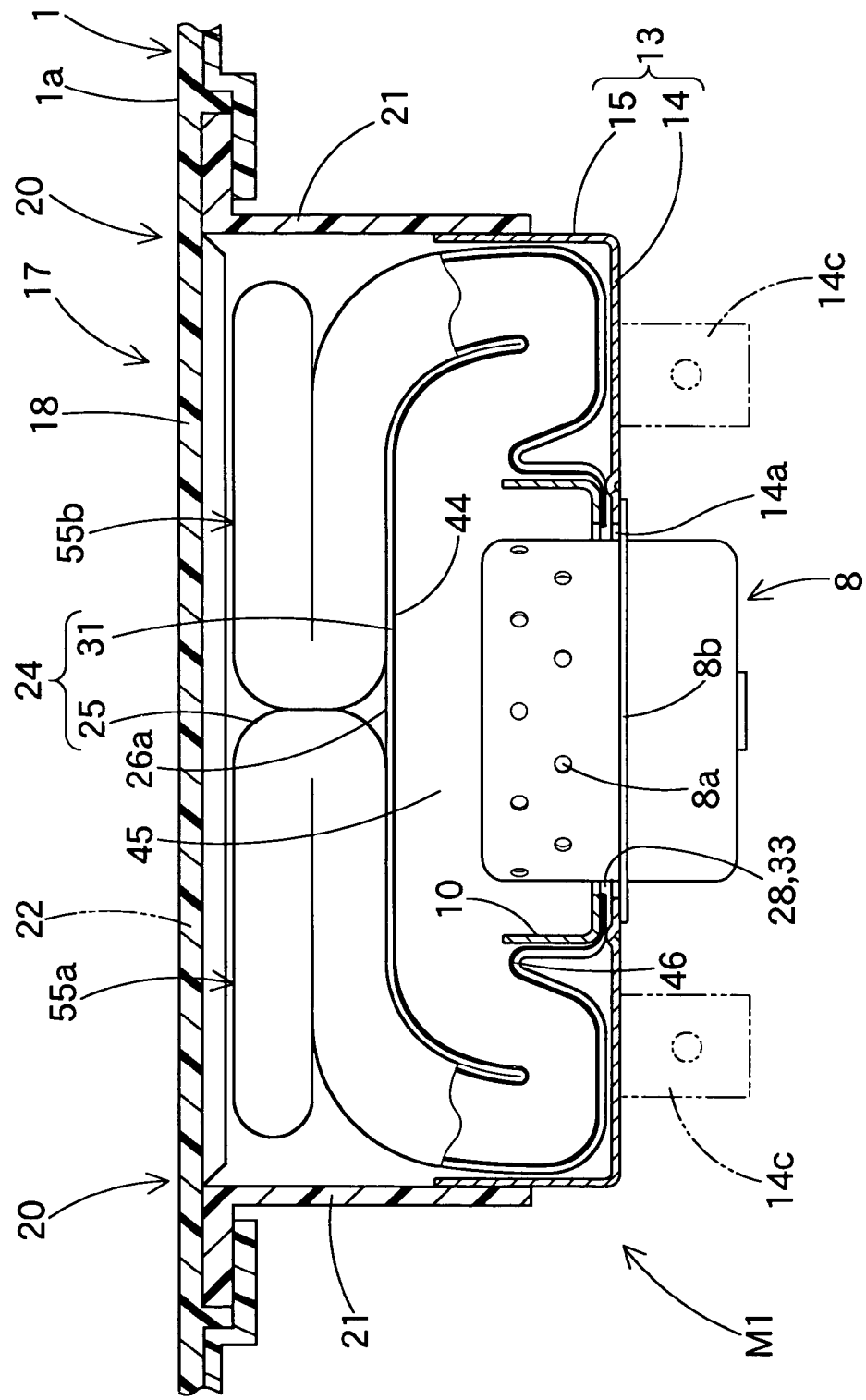
FIG. 3 is a schematic enlarged vertical section of the airbag device of FIG. 1, taken along left-right direction of vehicle.
Figure 4:
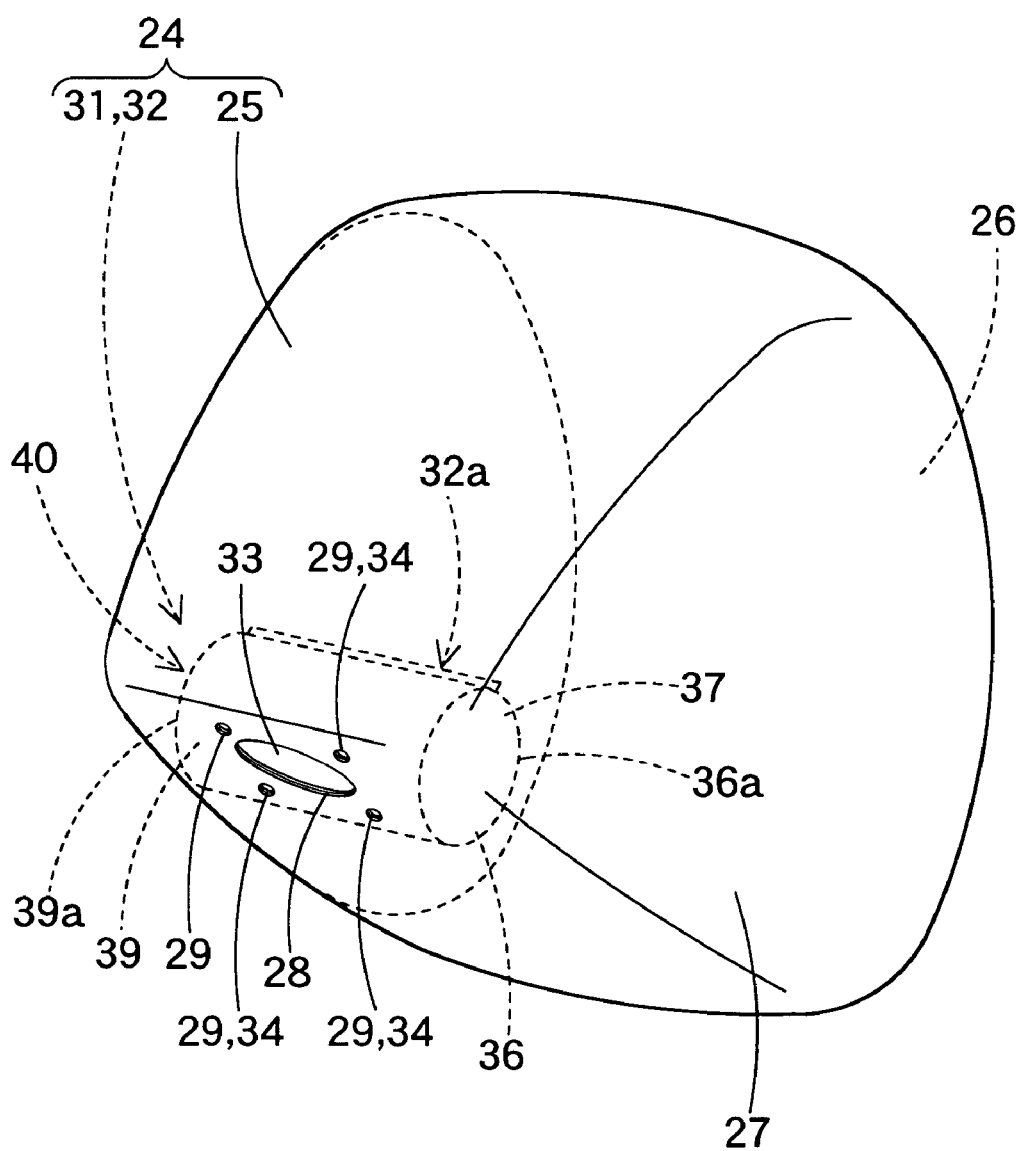
FIG. 4 is a perspective view of an airbag employed in the first embodiment, as inflated by itself.

FIGS. 1 to 3 illustrate a first embodiment of the airbag device for front passenger's seat of the present invention. This airbag device M1 is a top-mount type that is mounted on a top face 1a of instrument panel (as will be called dashboard herein after) 1 in front of front passenger's seat. The airbag device M1 includes a folded airbag 24, an inflator 8 for supplying the airbag 24 with inflation gas, a case 13 for housing and holding the airbag 24 and the inflator 8, a retainer 10 for attaching the airbag 24 to the case 13, and an airbag cover 17 for covering the folded airbag 24.

Here, front-rear, up-down and left-right in this specification are consistent with front-rear, up-down and left-right of vehicle which is equipped with an airbag device and drives straight-forward.

Referring to FIGS. 1 to 3, the airbag cover 17 is integral with the dashboard 1 in the first embodiment. The airbag cover 17 includes two doors 18 provided with a thinned breakable portion 20 therearound. The breakable portion 20 is arranged in an H-shape as viewed from upper side of the dashboard 1. The two doors 18 open front and rearwards, respectively, around their front or rear ends as hinges 19. When the two doors 18 are pushed by inflating airbag 24 and open front and rearwards upon breakage of the breakable portion 20, an opening 22 for releasing the airbag 24 is provided in a generally rectangular shape. The airbag 24 protrudes toward a passenger seated in front passenger's seat from the opening 22.

The airbag cover 17 further includes a joint wall 21 having a generally square cylindrical shape. The joint wall 21 is projected downward from back side of the airbag cover 17 to encircle arrangement positions of the doors 18. As shown in FIG. 2, the joint wall 21 is provided with a plurality of retaining holes 21a at predetermined positions confronting each other in front-rear direction. Retaining pawls 15a of the case 13 are inserted into the retaining holes 21a so as to retain the joint wall 21. The retention of the joint wall 21 by the retaining pawls 15a secures joinder of the joint wall 21 and the case 13 to help the inflating airbag 24 to push up the doors 18 and break the breakable portion 20 smoothly.

As shown in FIGS. 1 to 3, the case 13 is made of sheet metal into a generally rectangular parallelpiped shape, and has a rectangular opening 13a at the top. The case 13 includes a bottom wall 14 of a rectangular plate shape, and a side wall 15 extending upward toward the airbag cover 17 from outer circumferential edge of the bottom wall 14 in a generally square cylindrical shape. The bottom wall 14 has a rectangular plate shape elongated in left-right direction, and has in its center a generally round insert hole 14a for inserting an upper part of the inflator 8 from lower side toward the airbag cover 17. Around the insert hole 14a of the bottom wall 14 are mounting holes 14b for inserting bolts 1a of the retainer 10 therethrough. The bottom wall 14 is further provided at left and right positions in lower face thereof with brackets 14c for securing the case 13 to vehicle body 3. Each of the brackets 14c is provided with a nut 14d for fastening a bolt 6 thereinto. On the part of vehicle body 3 are brackets 5 extending from reinforcement 4. Each of the bolts 6 is inserted through a mounting seat 5a of the bracket 5 and fastened into the nut 14d. By fastening the bolts 6 into the nuts 14d, the case 13, or the airbag device M1 is secured to the body 3.

The side wall 15 of the case 13 is provided at front and rear upper ends thereof with a plurality of retaining pawls 15a turned outward and downward. As described above, each of the retaining pawls 15a is inserted into each of the retaining holes 21a in the joint wall 21 of the airbag cover 17 for retaining the joint wall 21.

As shown in FIGS. 1 to 3, the inflator 8 has a generally columnar shape provided with a flange 8b in outer circumference thereof. The inflator 8 is provided above the flange 8b with a plurality of gas discharge ports 8a for discharging inflation gas. The flange 8b has a generally square annular shape (or a generally square plate shape), and is provided at its four corners with mounting holes 8c for inserting the bolts 10a of the retainer 10 therethrough. Each of the mounting holes 8c is placed in a position corresponding to the mounting hole 14b in the bottom wall 14 of the case 13, and has the same internal diameter as the mounting hole 14b.

The retainer 10 has a square annular shape, so that the inflator 8 is inserted therethrough from lower side, and is provided at its four corners with the bolts 10a extending downward.

Referring to FIGS. 1 to 4, the airbag 24 includes an airbag body 25 that constitutes bag-shaped outer wall of the airbag and a flow-regulating cloth 31 provided within the airbag body 25. When completely expanded and inflated, the airbag 24 forms a triangular columnar shape whose axial direction is arranged in left-right direction. The airbag body 25 includes a passenger's side wall 26 and a circumferential wall 27. The passenger's sidewall 26 is deployed toward a passenger generally vertically in a circumference of the triangular column. The circumferential wall 27 extends from outer edge of the passenger's side wall 26 narrowing vertical dimension of the airbag body 25 toward vehicle's front part. The airbag 24 includes a round gas inlet port 28 for introducing inflation gas into the airbag in a lower side of front part of the circumferential wall 27, in the circumference of the triangular column. In a periphery of the gas inlet port 28 are four mounting holes 29. Upper part of the inflator 8 is inserted into the gas inlet port 28, and the bolts 10a of the retainer 10 are inserted into the mounting holes 29. In left and right sides of the circumferential wall 27, or in both end faces of the triangular column is each one vent hole (not shown) for emitting extra inflation gas.

The airbag body 25 and the flow regulating cloth 31 are formed of flexible woven fabric of synthetic resin such as polyamide.

Figure 5A:
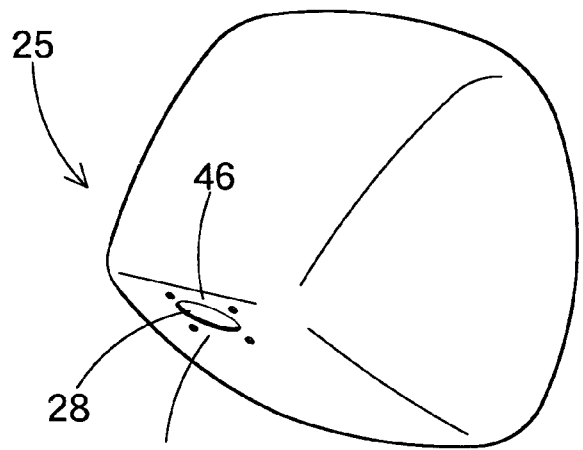
FIGS. 5A, 5B, 5C, 6A, 6B and 6C illustrate a folding process of the airbag of FIG. 4 in order.
Figure 5B:
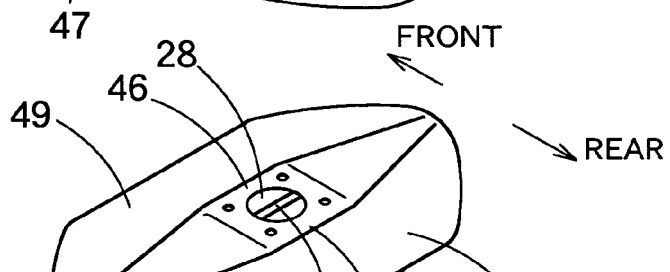
Figure 5C:
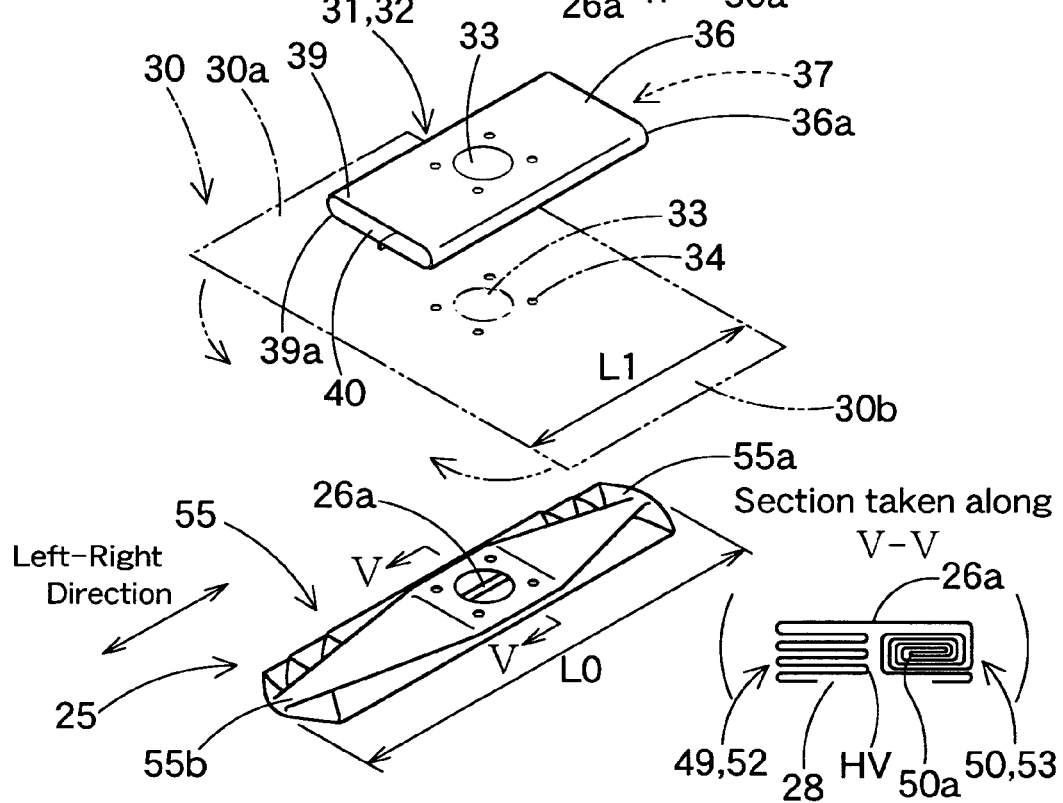

The flow regulating cloth 31 constitutes a pipe-shaped circumferential wall 32 extending in left-right direction. In a lower part of transverse center of the wall 32 is a gas inlet port 33. Left and right ends of the circumferential wall 32 serve as gas outlet ports 37 and 40, respectively. The inlet port 33 has the same round shape as the gas inlet port 28 of the airbag body 25, and there are mounting holes 34 for inserting the bolts 10a of the retainer 10 around the inlet port 33. As shown in FIG. 5C, the flow regulating cloth 31 is manufactured by sewing up front end 30a and rear end 30b of a rectangular cloth piece 30, and formed into a cylindrical shape whose inner diameter is uniform in left-right direction. In FIG. 5C, the cloth 31 is illustrated in crushed state. The cloth piece 30 is provided with the inlet port 33 and the mounting holes 34.

In the foregoing embodiment, length L1 (refer to FIG. 5C) of the flow regulating cloth 31 in left-right direction is greater than width W0 (refer to FIGS. 10 and 11) of the opening 22 of the airbag cover 17 in left-right direction, so that, when the airbag 24 completes inflation in mounted state on vehicle, circumferential walls 36 and 39 of left and right outlet ports 37 and 40 of the cloth 31 are located above the top face 1a of the dashboard 1. Moreover, the transverse length L1 is smaller than transverse width of the completely inflated airbag body 25, and is also smaller than transverse width L0 of the airbag body 25 which has gone through transverse folding step, as shown in FIG. 5C. The transverse folding step is part of folding process of the airbag body 25 in which the flatly developed airbag body 25 is folded on transverse folds to reduce its front-rear dimension. Moreover, as shown in FIG. 6C, transverse length L1 is greater than transverse width L2 of the completely folded-up airbag 24. To be more detailed, length L1 is greater than a distance L2 between left and right crest folds LM closest to the retainer 10 out of bellows-folds of the airbag 24 extending along front-rear direction, and allows the cloth 31 to be folded into the airbag body 25 over the left and right folds LM.

Figure 10:
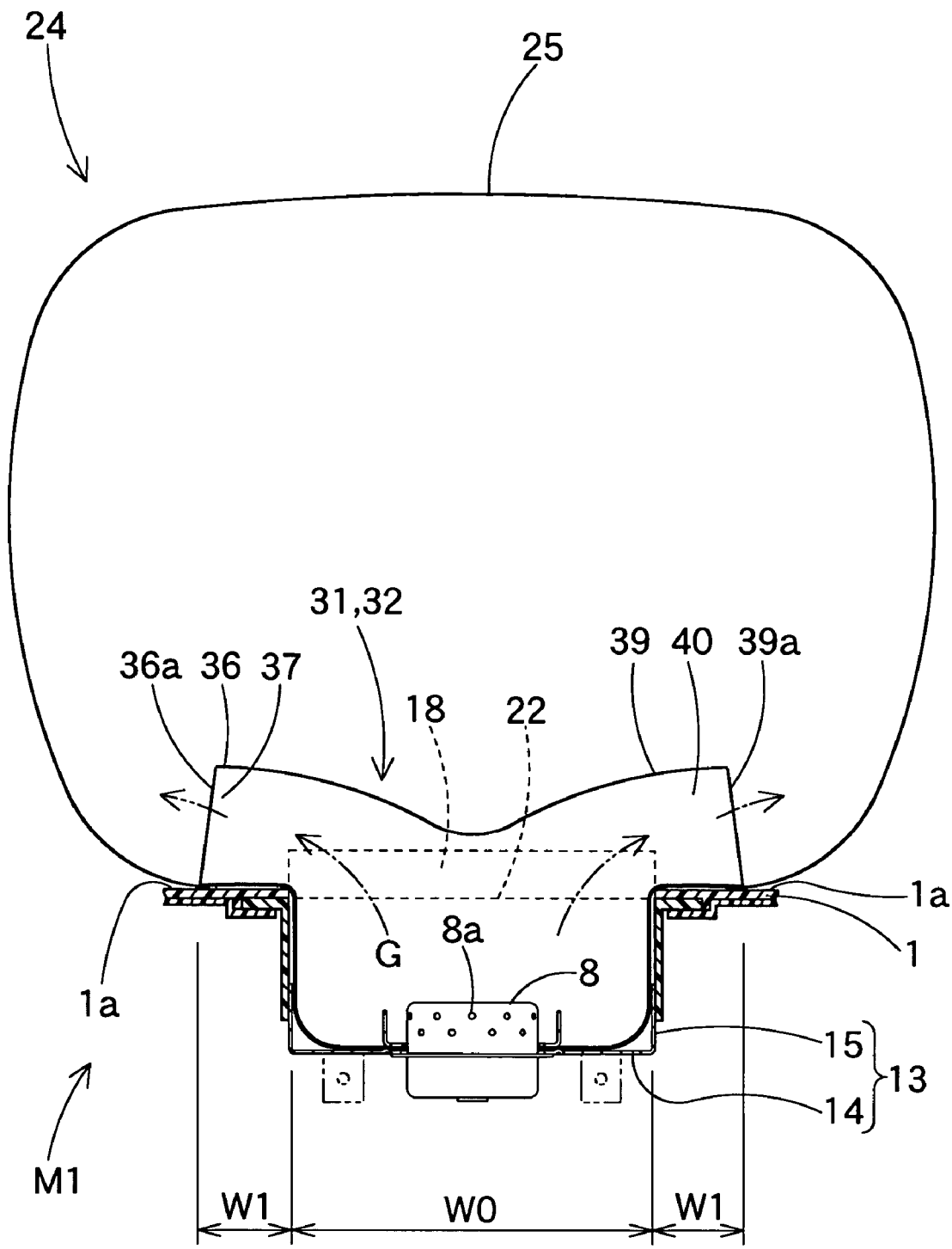
FIG. 10 is a schematic vertical section of the completely activated airbag device of FIG. 1, taken along left-right direction of vehicle.
Figure 11:
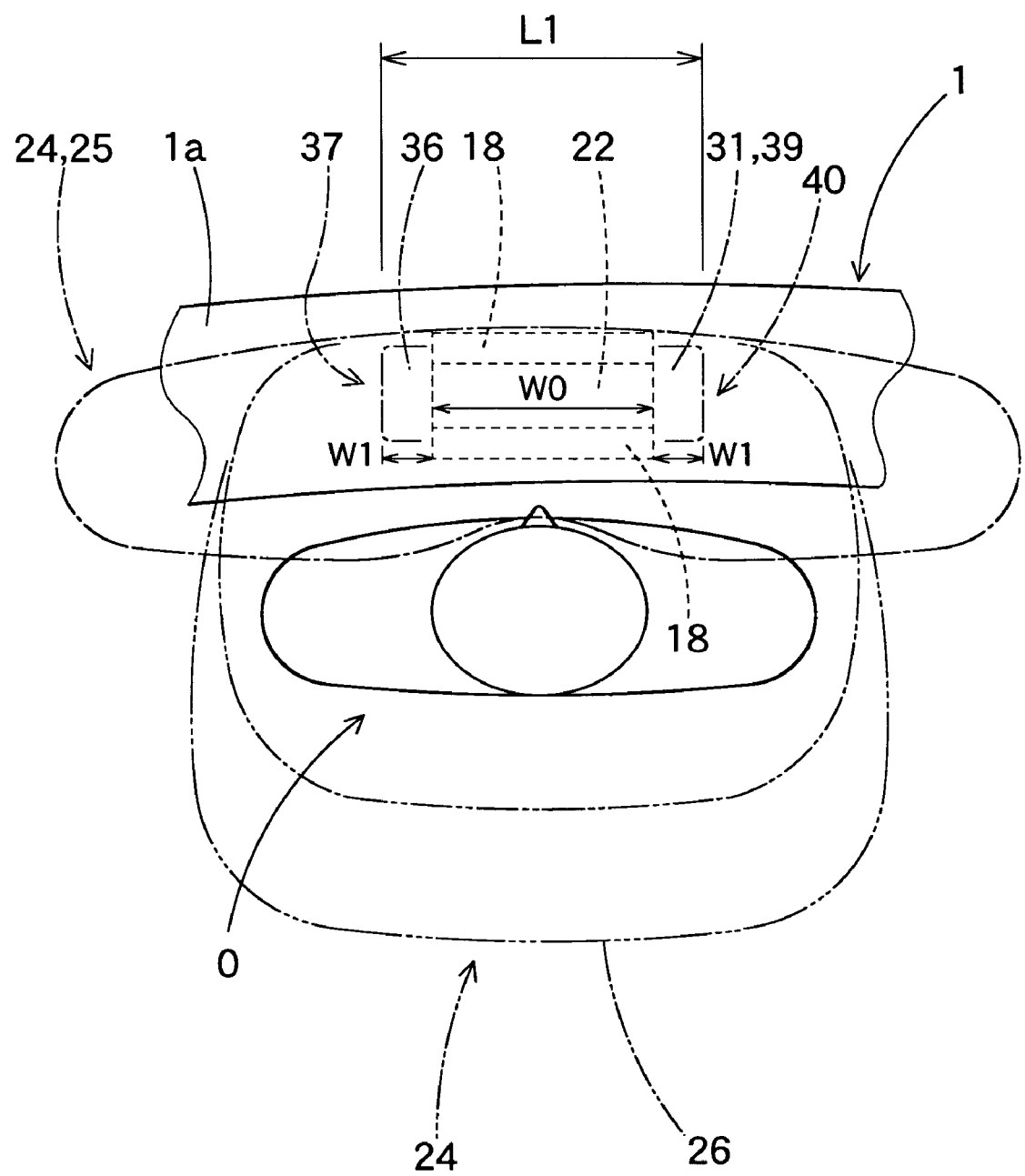
FIG. 11 is a schematic plan view of the airbag device of FIG. 1 in service.

As shown in FIGS. 10 and 11, moreover, in the flow regulating cloth 31 of the foregoing embodiment, each of projecting lengths W1 in left-right direction is predetermined so that end faces 36a and 39a of circumferential walls of the left and right outlet ports 37 and 40 do not abut against inner circumference of the completely inflated airbag body 25 as mounted on vehicle. The length W1 is also predetermined to be ⅕ of the transverse width W0 of the opening 22 of the airbag cover 17 or longer. In the illustrated embodiment, the length W1 is ¼ of the width W0. The projecting length W1 stands for length of each of leading ends of the circumferential walls 36 and 39 of the left and right outlet ports 37 and 40 that project from the opening 22 in left-right direction above the top face 1a of the dashboard 1.

Figure 8A:
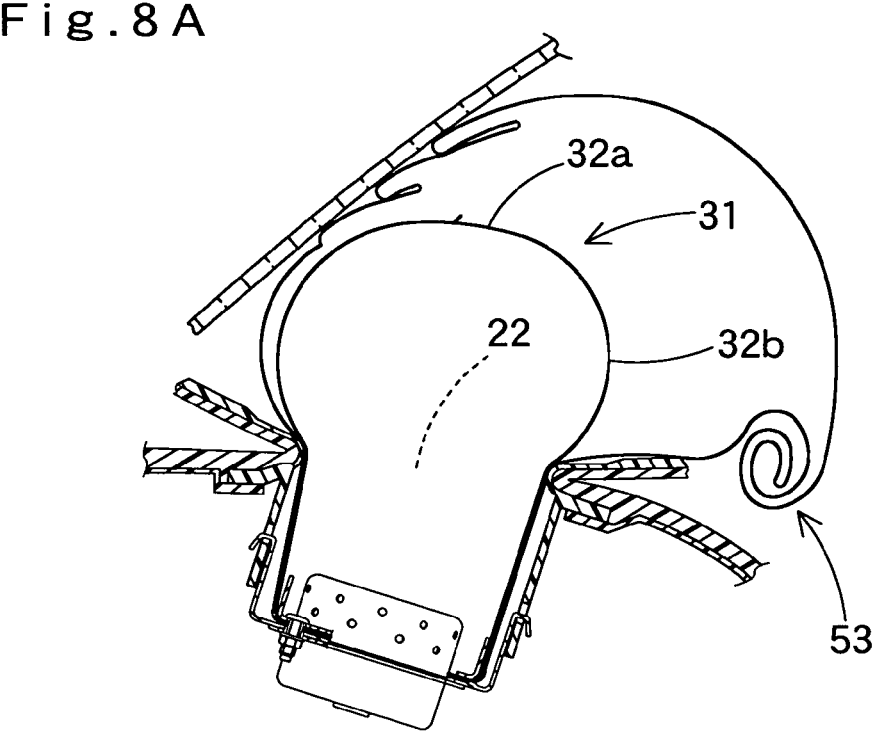

As shown in FIG. 8, moreover, inner diameter of the completely inflated cloth 31 is so predetermined that its upper end portion 32a confronting the inlet port 33 above the port 33 is disposed above the top face 1a of the dashboard 1. Especially in the foregoing embodiment, provided that height from the bottom wall 14 of the case 13 to the opening 22 is H0, and that height from the inlet port 33 to the upper end portion 32a as the cloth 31 is completely inflated is H1, relationship between H0 and H1 is H0<H1<3×H0. In the illustrated embodiment, H1 is approximately equal to 2×H0. In relation with mounted condition on vehicle, the inner diameter of the cloth 31 is predetermined so that a rear end portion 32b of the cloth 31 near the inlet port 33 is disposed forward of rear face 1b of the dashboard 1.

The flow regulating cloth 31 serves as an auxiliary bag for promoting deployment of the airbag body 25. That is, the cloth 31 inflates firstly upon inflow of inflation gas, and so redirects stream of inflation gas as to supply the gas to the airbag body 25. When the airbag 24 is folded and housed in the case 13, as shown in FIG. 2, the cloth 31 of the foregoing embodiment is so arranged within the airbag body 25 to include a gas upstream portion 42, a gas downstream portion 44, and a joining portion 43 that joins the upstream portion 42 and the downstream portion 44, in a section taken along deployment direction of the airbag 24 from the inlet port 33, which is located upstream of inflation gas G, to rear part of deployed airbag 24, i.e., in a section taken along front-rear direction of vehicle via the inlet port 33. In the foregoing embodiment, the cloth 31 is inflated in a generally annular shape in a section taken along front-rear direction when the airbag 24 is completely deployed. Therefore, more specifically, in a section taken along front-rear direction of the inlet port 33, i.e., in a generally annular-shaped section via the inlet port 33, the gas upstream portion 42 stands for a lower circumferential wall around the inlet port 33, the downstream portion 44 stands for an upper circumferential wall located above the inlet port 33 to confront the port 33, and the joining portion 43 stands for circumferential walls confronting in front-rear direction between the upper and lower circumferential walls.

In FIG. 2, a portion designated by reference numeral 55b located above the downstream portion 44 is a right portion out of left and right portions of transversely-folded body 55 (refer to FIG. 6C) which are bellows-folded and placed over the gas inlet port 28. This right portion 55b is not shown as a section, in FIG. 2, together with a left portion 55a (refer to FIG. 6C), in a section taken along front-rear direction of vehicle via the inlet port 33 as the folded airbag 24 is housed in the case 13.

In the foregoing embodiment, as shown in FIG. 2, the joining portion 43 of the flow regulating cloth 31 is disposed around or between fold masses 52 and 53 of the airbag body 25, not folded into folds of the masses 52 and 53, so that the joining portion 43 joins the upstream portion 42 and downstream portion 44 straightly.

The downstream portion 44 of the cloth 31 is arranged generally perpendicularly to the joining portion 43 in a flattened two-ply state, and is laid out to contact back face of a wall portion 26a of the airbag body 25 which is located ahead in deployment direction of the airbag 24. Moreover, the downstream portion 44 is disposed over outer surfaces (or on top faces) of the two fold masses 52 and 53 of the folded and housed airbag body 25.

To assemble the airbag device M1 for front passenger's seat of the first embodiment, the airbag 24 is folded up firstly. At first, preparatory folding is applied to the airbag body 25, as shown in FIGS. 5A and 5B. In the preparatory folding, each of front and rear peripheral portions 46 and 47 in the periphery of the gas inlet port 28 is folded in the airbag body 25 on a valley fold while the passenger's side wall 26 is flatly developed. At this time, an upper area 26a of the passenger's side wall 26 which is to engage head or therearound of a passenger (i.e., the wall portion 26a laid out to contact the downstream portion 44) is placed over the gas inlet port 28 in the interior of the airbag body 25, so that a front developed portion 49 is provided forward of the gas inlet port 28, and a rear developed portion 50 is provided rearward of the inlet port 28. Thus the preparatory folding is completed.

Subsequently, as shown in FIGS. 5B and 5C, the airbag body 25 is transversely folded to form the transversely-folded body 55. More specifically, in the front developed portion 49, a portion from the area 26a to the front peripheral portion 46 is bellows-folded to pile vertically on valley folds HV extending along left-right direction and disposed up to the vicinity of the gas inlet port 28, so that a front fold mass 52 is formed. The rear developed portion 50 is roll-folded from its edge 50a downward and forward in mounted condition on vehicle, which provides a rear fold mass 53, and the transversely-folded body 55 is formed.

Figure 6A:
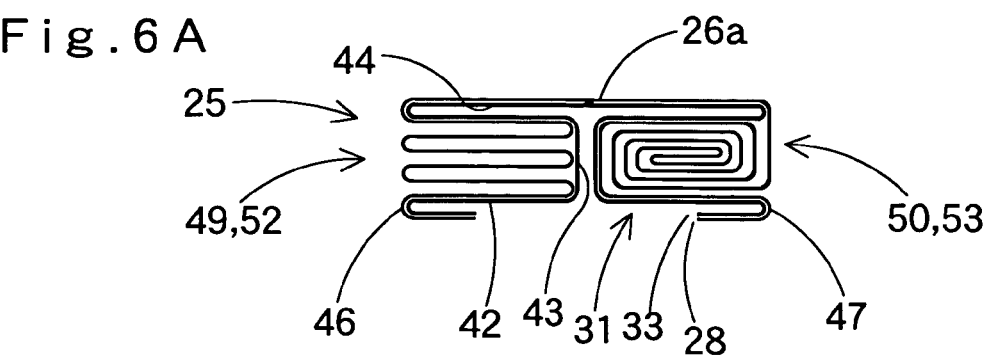

Thereafter, as shown in FIGS. 5C and 6A, the flow regulating cloth 31 which has been formed into cylindrical shape in advance is put into the airbag body 25 from the inlet port 28, and the inlet port 33 and mounting holes 34 are matched with the gas inlet port 28 and mounting holes 29 of the airbag 24. Then the upstream portion 42 in the periphery of the inlet port 33 of the cloth 31 is laid out over the front and rear peripheral portions 46 and 47, i.e., around the inlet port 28, in the interior of the airbag body 25, and the joining portion 43 is located between the fold masses 52 and 53. Then the downstream portion 44 is flatly developed and located between the top faces of the fold masses 52 and 53 and back face of the wall portion 26a of the passenger's side wall 26a.

Figure 6B:
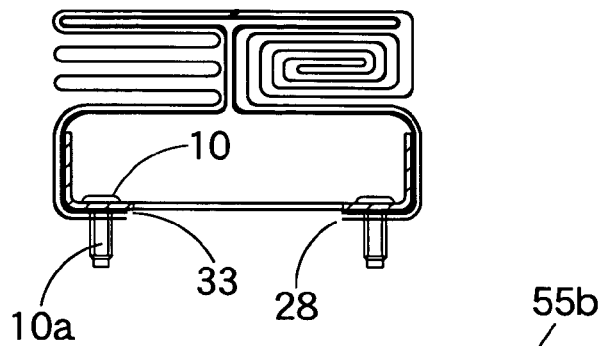
Figure 6C:
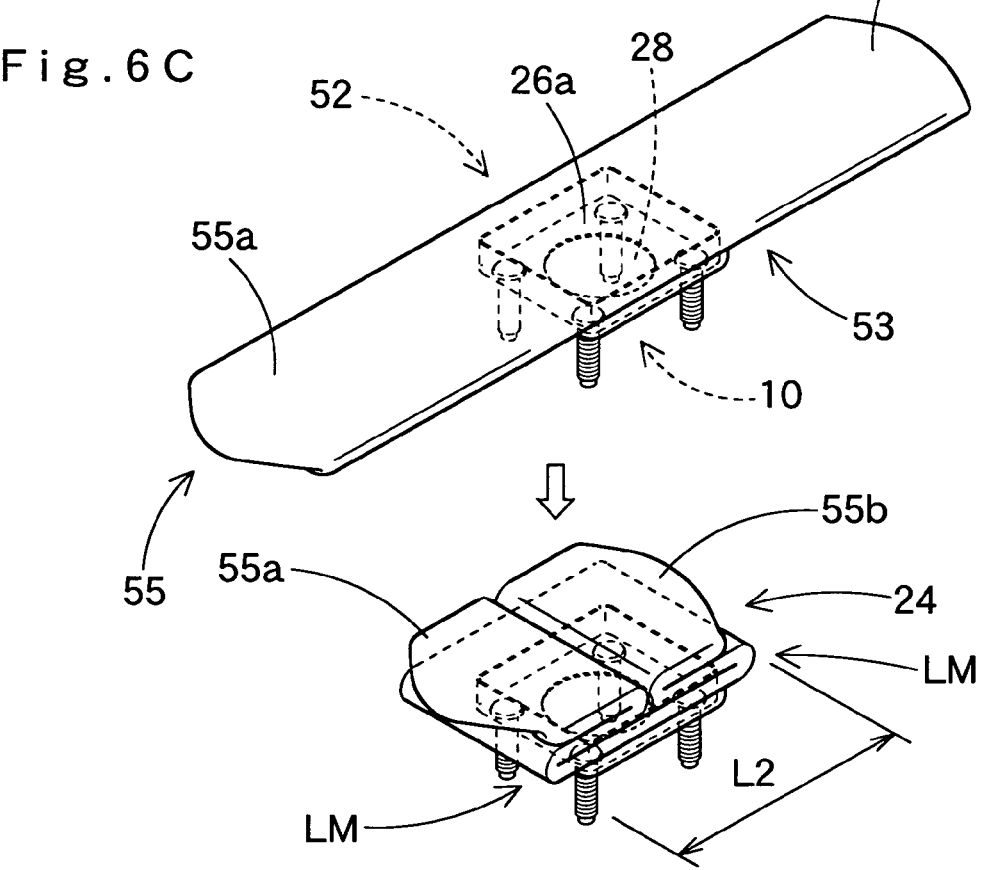

Thereafter, as shown in FIG. 6B, the retainer 10 is inserted into the airbag 24 via the inlet ports 28 and 33 so that the bolts 10a may be protruded out of the airbag 24 from the mounting holes 29 and 34. Then the left and right portions 55a and 55b are bellows-folded on folds extending along front-rear direction, as shown in FIG. 6C, and the folded airbag 24 is wrapped by a breakable wrapping sheet 57, as shown in FIG. 2, to keep the folded-up configuration.

Then, the folded airbag 24 is located on the bottom wall 14 of the case 13 from the top opening 13a while inserting the individual bolts 10a into the mounting holes 14b from above. Subsequently, an upper portion of the inflator 8 is inserted through the insert hole 14a, the inlet ports 28 and 33 from lower side, and the bolts 10a protruded downward from the bottom wall 14 are inserted through the mounting holes 8c of the flange 8b of the inflator 8. Thereafter, the nuts 11 are fastened with the bolts 10a protruded from the flange 8b. Thus the airbag 24 and the inflator 8 are attached to the bottom wall 14 of the case 13.

Thereafter, the side wall 15 of the case 13 is inserted within the joint wall 21 of the airbag cover 17 in the dashboard 1 mounted on the vehicle, and the individual retaining pawls 15a of the case 13 are inserted into the retaining holes 21a of the joint wall 21 to be retained by the joint wall 21. If the bolts 6 are fastened into the nuts 14d of the individual brackets 14c through the bracket 5, the airbag device M1 for front passenger's seat is mounted on the vehicle.

Alternatively, the mounting of the airbag device M1 on the vehicle may be made by attaching the airbag 24 and the inflator 8 to the case 13, attaching this case 13 to the airbag cover 17 of the dashboard 1, and securing this airbag device M1 to the body 3 with the bolts 6 when mounting the dashboard 1 on the vehicle.

After mounting the airbag device M1 on the vehicle, when inflation gas G is discharged from the gas discharge ports 8a of the inflator 8, the airbag 24 inflates and breaks the wrapping sheet 57. The airbag 24 further breaks the breakable portion 20 of the airbag cover 17 and opens the doors 18 as indicated by double-dotted lines in FIGS. 1 and 2, and then protrudes from the opening 22 provided by the opening of the doors 18.

In the airbag device M1 for front passenger's seat of the first embodiment, the flow regulating cloth 31 is inflated firstly in the initial stage of inflation of the airbag 24. At this time, as shown in FIGS. 7A, 7B, 9A and 9B, the circumferential walls 36 and 39 of the left and right outlet ports 37 and 40 for supplying inflation gas G to left and right sides of the airbag body 25 are so projected left and rightwards from the opening 22 of the dashboard 1 as to be located above the top face 1a of the dashboard 1 in the left and right peripheries of the opening 22. Accordingly, when the cloth 31 completes inflation, the left and right outlet ports 37 and 40 are disposed above the top face 1a of the dashboard 1 in the left and right peripheries of the opening 22, so that inflation gas G is fed left and rightwards, i.e., outward in a free space out of the dashboard 1, in the airbag body 25. As a result, the cloth 31 securely helps develop the airbag body 25 in the initial stage of inflation widely left and rightwards. The airbag body 25 inflates rearward toward front passenger's seat in order of indications by single-dotted lines, double-dotted lines, triple-dotted lines in FIG. 11, while keeping the passenger's side wall 26 in a vertically developed state.

Therefore, the airbag device M1 for front passenger's seat of the first embodiment stably suppresses partial protrusion of the airbag 24 toward front passenger's seat in the initial stage of inflation, and protects the passenger O smoothly with the airbag 24 even if a passenger O (refer to FIG. 11) was seated close to the dashboard 1 and moves over in the initial stage of inflation.

Supply of inflation gas G to the airbag body 25 is performed when the flow regulating cloth 31 is completely inflated. Accordingly, even if the airbag body 25 is folded up in a different way, the cloth 31 helps develop the airbag body 25 widely left and rightwards in the initial stage of inflation without being affected by the difference of the folding method. That is, for example, the airbag 24 may be folded as follows: the passenger's side wall 26 is flatly developed and overlaid on the gas inlet port 28 side together with the cloth 31 put into the airbag body 25, and transverse folding is applied to the airbag body 25 firstly, so that the airbag body 25 is folded on folds extending along left-right direction, and its dimension is reduced in front-rear direction. Then vertical folding is applied thereto so that the airbag body 25 is folded on folds extending along front-rear direction and its dimension is reduced in left-right direction. Alternatively, transverse folding may be applied after vertical folding, after the passenger's side wall 26 is flatly developed and overlaid on the gas inlet port 28 side together with the cloth 31.

The flow regulating cloth 31 of the first embodiment is formed into a pipe shape which includes the left and right outlet ports 37 and 40 in left and right ends, respectively, and the gas inlet port 33 in generally transverse center of circumferential wall thereof. Accordingly, this flow regulating cloth 31 is formed into a pipe shape easily by stitching to join both edges 30a and 30b of a generally rectangular plate shaped cloth member 30.

Moreover, the cloth 31 is constructed such that leading ends of the circumferential walls 36 and 39 of the left and right outlet ports 37 and 40 project on top face 1a of the dashboard 1, and each of the projecting lengths W1 in left-right direction from the opening 22 is predetermined so that the end faces 36a and 39a of circumferential walls of the left and right outlet ports 37 and 40 do not abut against inner circumference of the completely inflated airbag body 25, and the length W1 is also predetermined to be ¼, which is greater than ⅕, of transverse width of the opening 22 of the airbag cover 17.

With this arrangement, inflation gas G is stably supplied left and rightwards, i.e., outward in the airbag body 25 from the left and right outlet ports 37 and 40 of the cloth 31 without being blocked by the wall of the airbag body 25. Moreover, each of the projecting lengths W1 of leading ends of the circumferential walls 36 and 39 of the left and right outlet ports 37 and 40 is ⅕ of transverse width W0 of the opening 22 of the airbag cover 17 or longer, which is not too short. Accordingly, inflation gas G is stably supplied to left and right parts of the airbag body 25 from the left and right outlet ports 37 and 40. If the projecting length W1 is less than ⅕ of the width W0, it is likely that inflation gas G is not smoothly supplied to left and right parts of the airbag body 25 due to unstable axial directions of the outlet ports 37 and 40.

Furthermore, in the top-mount type airbag device M1 of the first embodiment, inner diameter of completely inflated flow regulating cloth 31 is so predetermined that its upper end portion 32a confronting the inlet port 33 above the port 33 projects above the top face 1a of the dashboard 1. In addition, provided that height from the inlet port 33 positioned at the case bottom wall 14 to the opening 22 is H0, and that height from the inlet port 33 to the upper end portion 32a as the cloth 31 is completely inflated is H1, relationship between H0 and H1 is H0<H1<3×H0. That is, in relation with mounted condition on vehicle, the inner diameter of the cloth 31 is constructed so that, when the cloth 31 is completely inflated, the rear end portion 32b of the cloth 31 proximate to the inlet port 33 is disposed forward of rear face 1b of the dashboard 1 while the height H1 from the inlet port 33 to the upper end portion 32a is suppressed.

Accordingly, the airbag body 25 does not unnecessarily protrude rearward from the rear face 1b in the initial stage of inflation. Consequently, even if a child or a back rest of a child seat mounted backward approaches the dashboard 1, pressure applied to them is suppressed.

This first invention of the present application may be applied to a mid-mount type airbag device for front passenger's seat which locates an opening for airbag deployment in the vicinity of rear face 1b of dashboard 1. In this case, too, inner diameter of completely inflated flow regulating cloth 31 may be predetermined such that its portion 32a confronting the inlet port 33 in a side toward front passenger's seat projects from surface 1b of the dashboard 1. Moreover, provided that height from the inlet port 33 positioned at the case bottom wall 14 to the opening 22 is H0, and that height from the inlet port 33 to the portion 32a as the cloth 31 is completely inflated is H1, the flow regulating cloth is constructed such that relationship between H0 and H1 is H0<H1<3×H0. With this construction, pressure applied to a passenger is suppressed in the initial stage of inflation even if the passenger is seated close to the dashboard 1.

Figure 12:
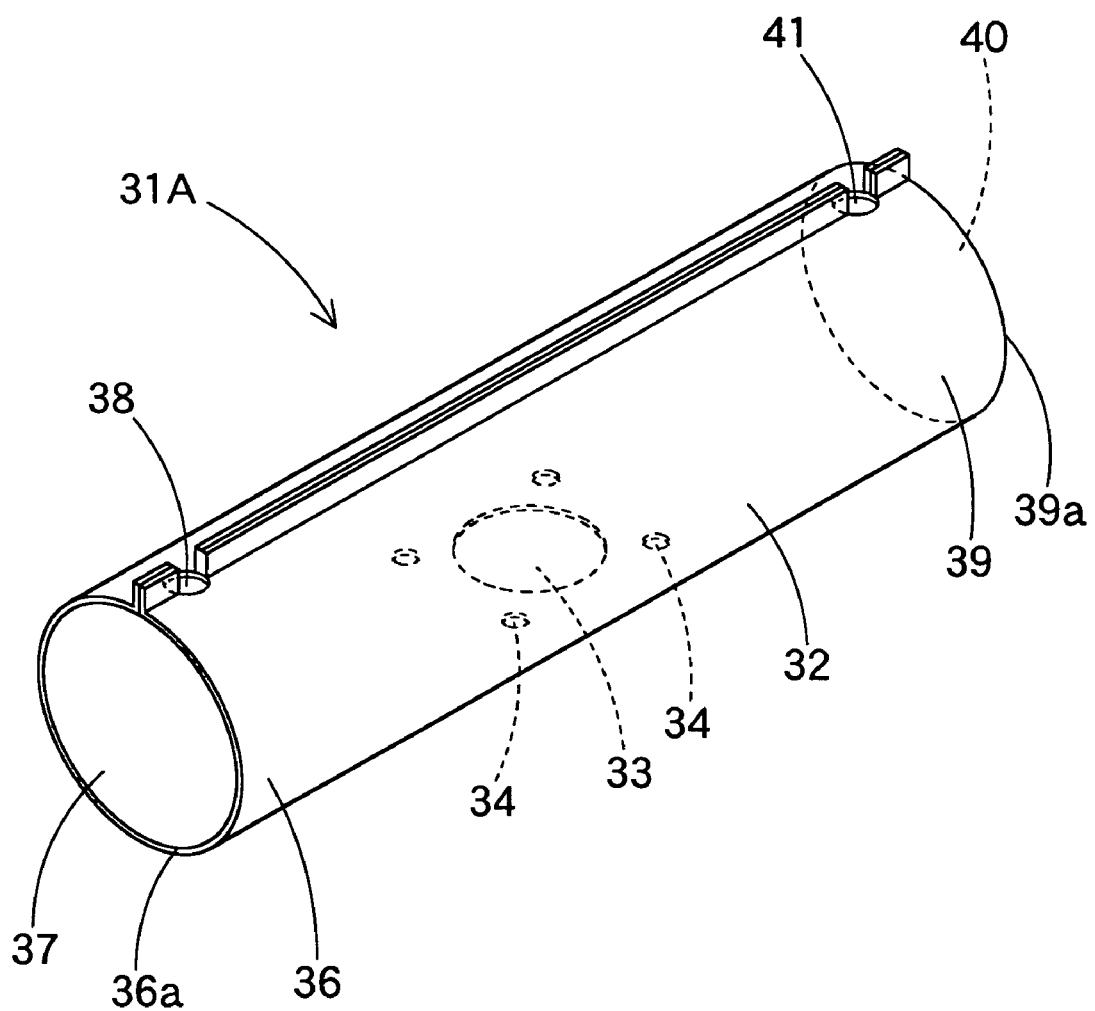
FIG. 12 is a perspective view of a flow regulating cloth used in a second embodiment.
Figure 13:
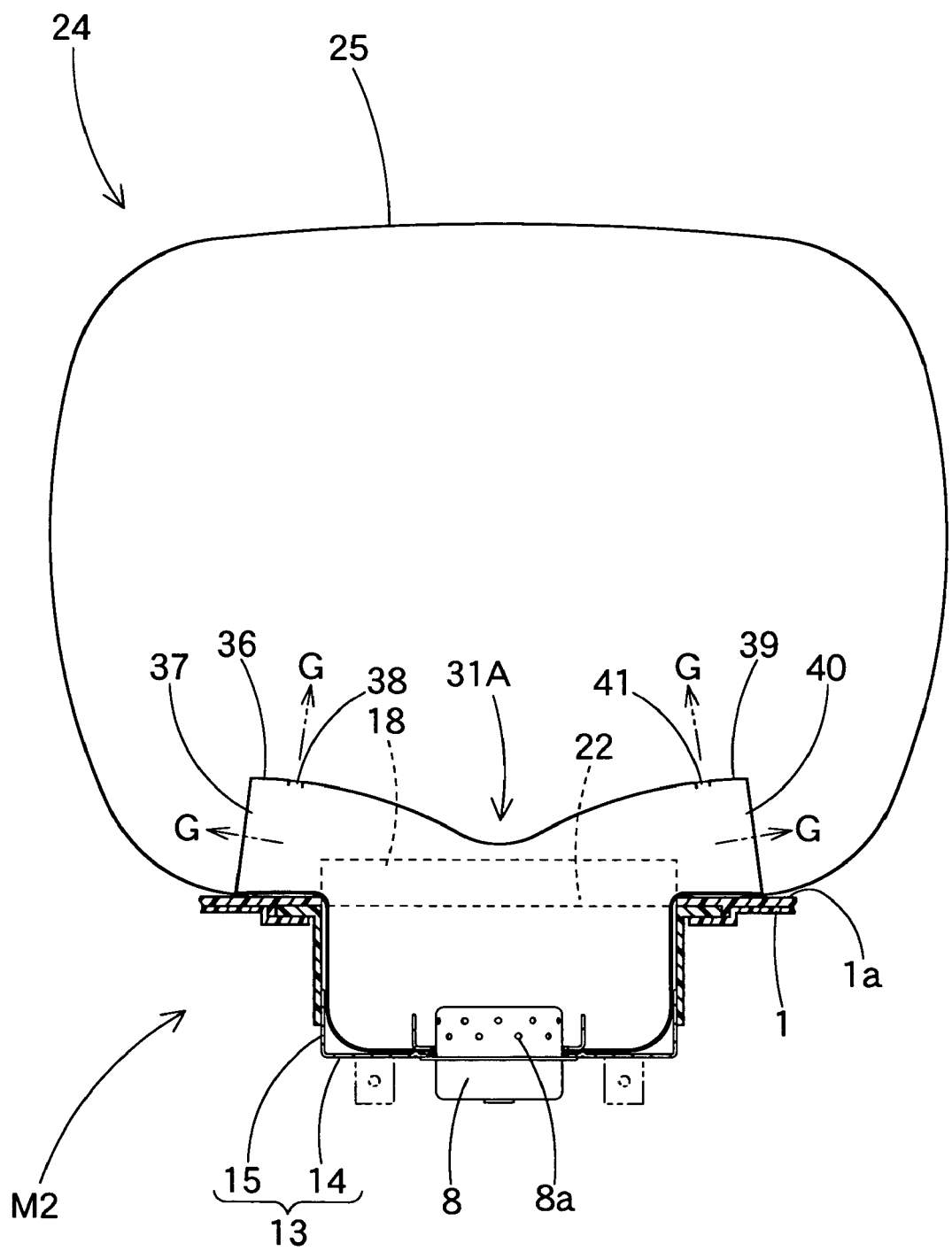
FIG. 13 is a schematic vertical section of a completely activated airbag device for front passenger's seat of the second embodiment, taken along left-right direction of vehicle.

It will also be appreciated that a flow regulating cloth is provided with auxiliary outlet ports 38 and 41 on the circumferential wall 32 between the left outlet port 37 and the right outlet port 40, as in a flow regulating cloth 31A of a second embodiment shown in FIGS. 12 and 13. These auxiliary outlet ports 38 and 41 help supply inflation gas G to a direction perpendicular to left-right direction. The airbag device M2 thus constructed develops the airbag body 25 widely in vertical direction etc. as well as in transverse direction with inflation gas G emitted from the auxiliary ports 38 and 41.

Especially, as in the illustrated embodiment, if the auxiliary ports 38 and 41 open upward, i.e., toward deployment direction of the airbag 24 in the circumferential walls 36 and 39 located above the top face 1a of the dashboard 1, reaction force from inflation gas G emitted out of the ports 38 and 41 applies to the circumferential walls 36 and 39 and presses the same onto the top face 1a, i.e., surface of the dashboard 1. Consequently, axial directions of the circumferential walls 36 and 39 are stabilized to extend along left-right direction. As a result, in the flow regulating cloth 31A provided with the auxiliary outlet ports 38 and 41, stream direction of inflation gas G flowing left and rightwards from the left and right outlet ports 37 and 40 are further stabilized.

Although the illustrated embodiment shows the cloth 31A provided with only one each auxiliary port 38 and 41 in each of the circumferential walls 36 and 39. However, unless the circumferential walls 36 and 39 lose stability, a plurality of auxiliary outlet ports 38 and 41 may be formed along circumferential, or axial direction of the circumferential walls 36 and 39.

Figure 14:
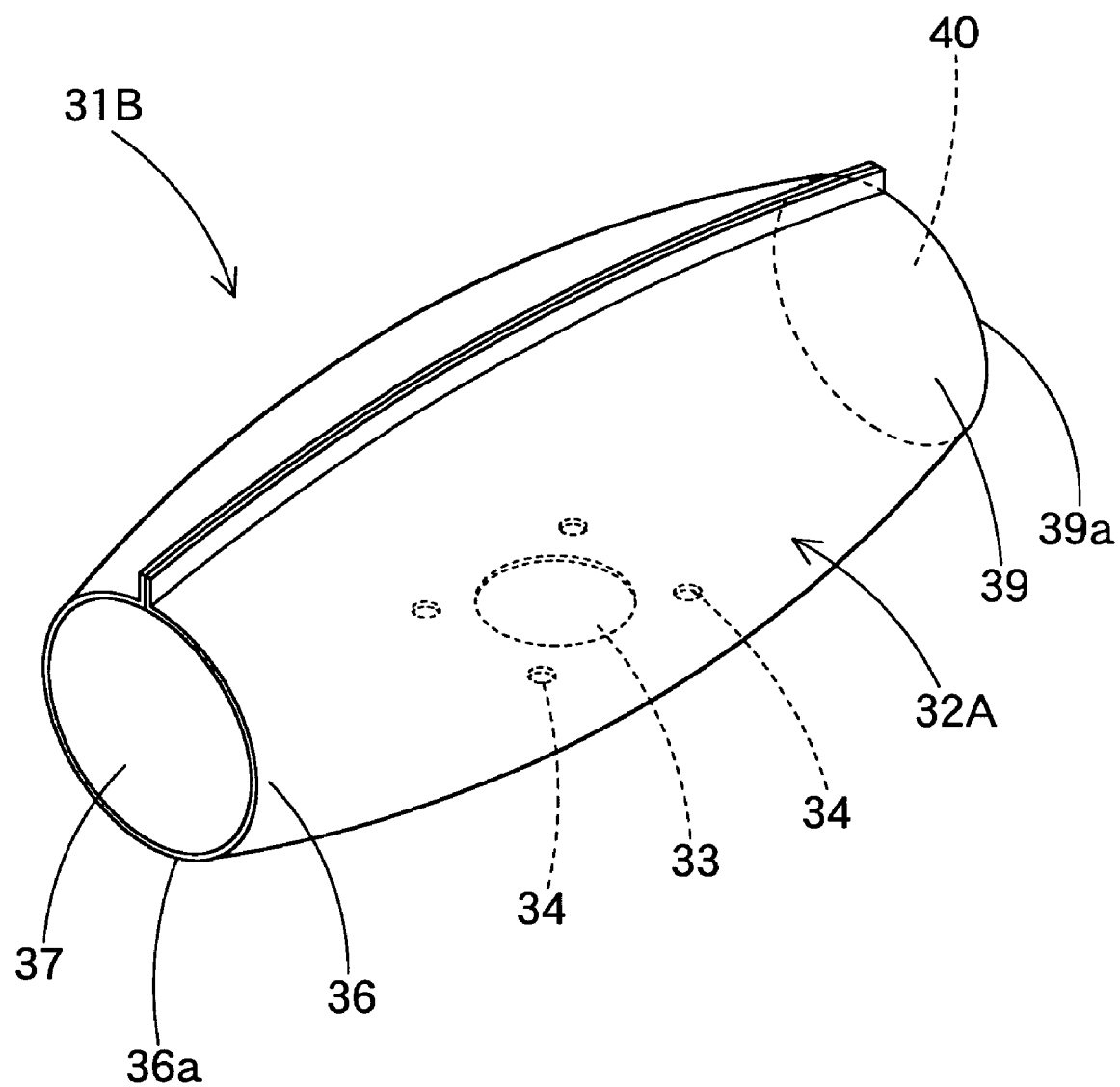
FIG. 14 is a perspective view of a flow regulating cloth used in a third embodiment.
Figure 15:
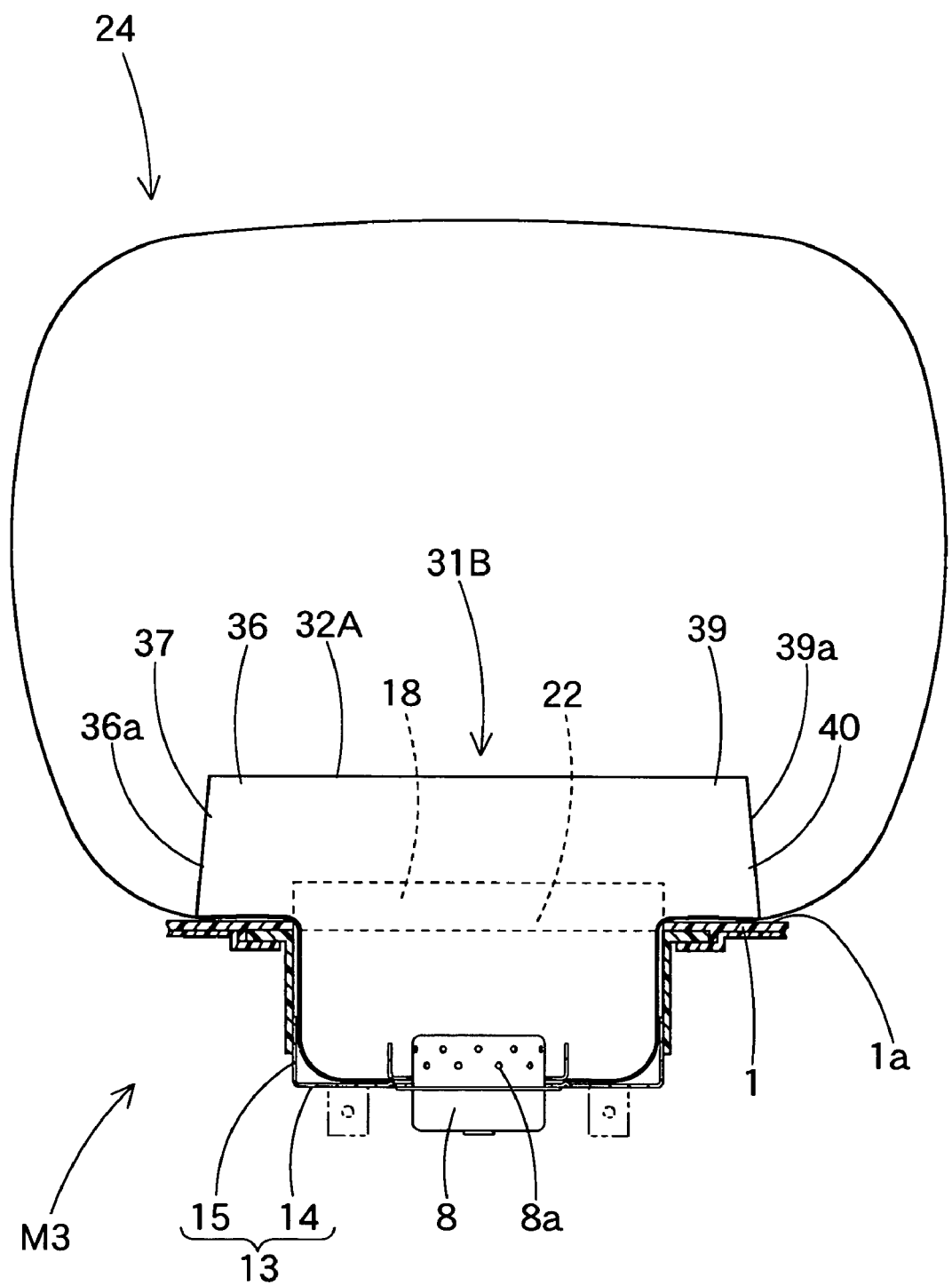
FIG. 15 is a schematic vertical section of a completely activated airbag device for front passenger's seat of the third embodiment, taken along left-right direction of vehicle.

A flow regulating cloth may be constructed as a flow regulating cloth 31B of a third embodiment shown in FIGS. 14 and 15. The cloth 31B has a columnar shape, and inner diameter in the vicinity of the inlet port 33 is greater than that in the vicinity of left and right outlet ports 37 and 40. In an airbag device M3 for front passenger's seat thus constructed, a top face side of a pipe-shaped circumferential wall 32A extends along left-right direction, upon inflation of the flow regulating cloth 31B. Accordingly, the cloth 31B stably supplies inflation gas G emitted out of the left and right outlet ports 37 and 40 along surface 1a of the dashboard 1, and along left-right direction in the airbag body 25.

Figure 16:
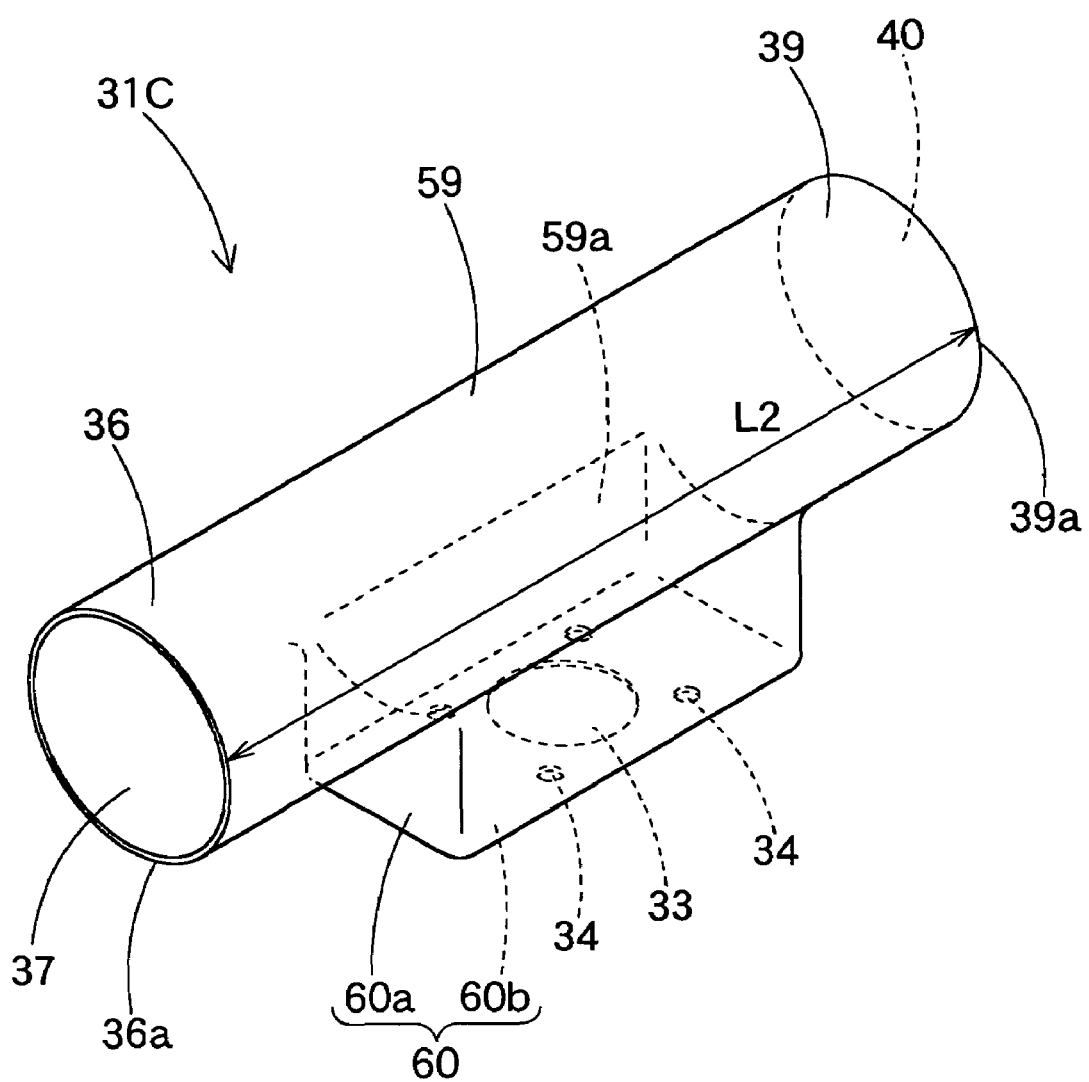
FIG. 16 is a perspective view of a flow regulating cloth used in a fourth embodiment.
Figure 17:
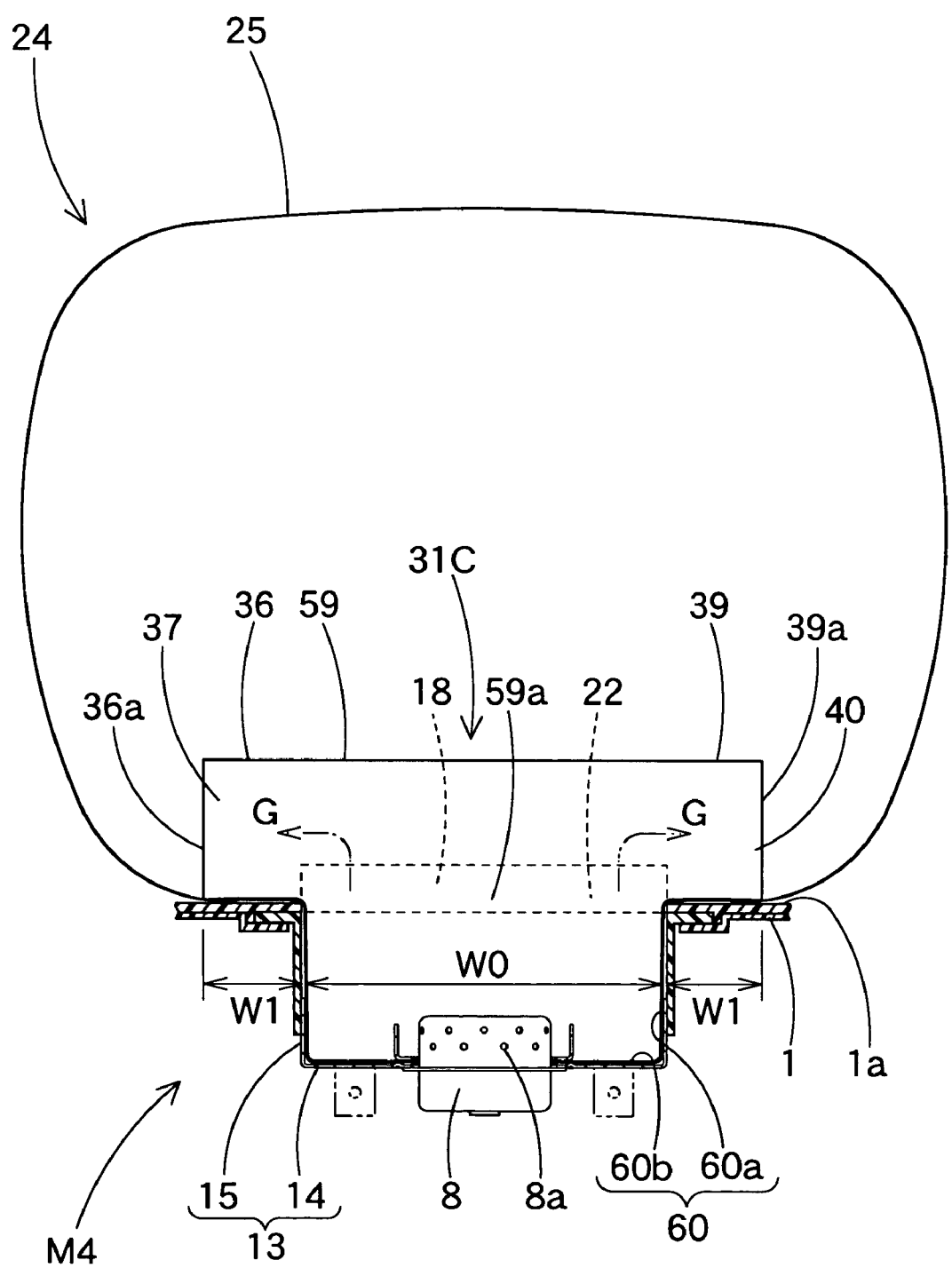
FIG. 17 is a schematic vertical section of a completely activated airbag device for front passenger's seat of the fourth embodiment, taken along left-right direction of vehicle.

It will also be appreciated that the flow regulating cloth is constructed as a flow regulating cloth 31C of a fourth embodiment shown in FIGS. 16 and 17. The cloth 31C includes a surface side portion 59 and an inlet side portion 60. The surface side portion 59 is formed into a pipe-shape disposed above top face 1a of the dashboard 1 upon inflation of the airbag 24 with its axial direction extending in left-right direction, and includes left and right outlet ports 37 and 40, respectively, at its left and right ends. The inlet side portion 60 includes a circumferential wall 60a and a bottom wall 60b, and is perpendicularly communicated with the surface side portion 59 with a communication hole 59a that is located in generally transverse center of circumference of the surface side portion 59. The bottom wall 60b includes an inlet port 33 and mounting holes 34.

The inlet side portion 60 is formed into a generally square cylindrical shape corresponding to an inner shape of the case 13 from the bottom wall 14 to the opening 22. Transverse length L2 of the surface side portion 59 is predetermined such that leading ends of circumferential walls 36 and 39 of the left and right outlet ports 37 and 40 project on top face 1a of the dashboard 1 when the flow regulating cloth 31C is completely inflated. Each of projecting lengths W1 in left-right direction from the opening 22 is predetermined so that end faces 36a and 39a of circumferential walls of the left and right outlet ports 37 and 40 do not abut against inner surface of the completely inflated airbag body 25. Moreover, the length W1 is also predetermined to be ⅕ of transverse width W0 of the opening 22 of the airbag cover 17 or longer.

In the airbag device M4 for front passenger's seat thus constructed, when the flow regulating cloth 31C inflates in the initial stage of inflation of the airbag 24, the surface side portion 59 projects on top face 1a of the dashboard 1 with the left inlet port 37 and the right inlet port 40 arranged straightly. Accordingly, inflation gas G flown from the inlet side portion 60 is divided in left-right direction at generally transverse center of the surface side portion 59, and stably emitted to reverse directions, i.e. in left and right directions, from the left and right outlet ports 37 and 40. Consequently, the airbag body 25 is securely developed in left-right direction in the initial stage of inflation.

The surface side portion 59 of the flow regulating cloth 31C, or the flow regulating cloth 31B may be provided with auxiliary outlet ports 38 and 41, as in the flow regulating cloth 31A.

Figure 7A:
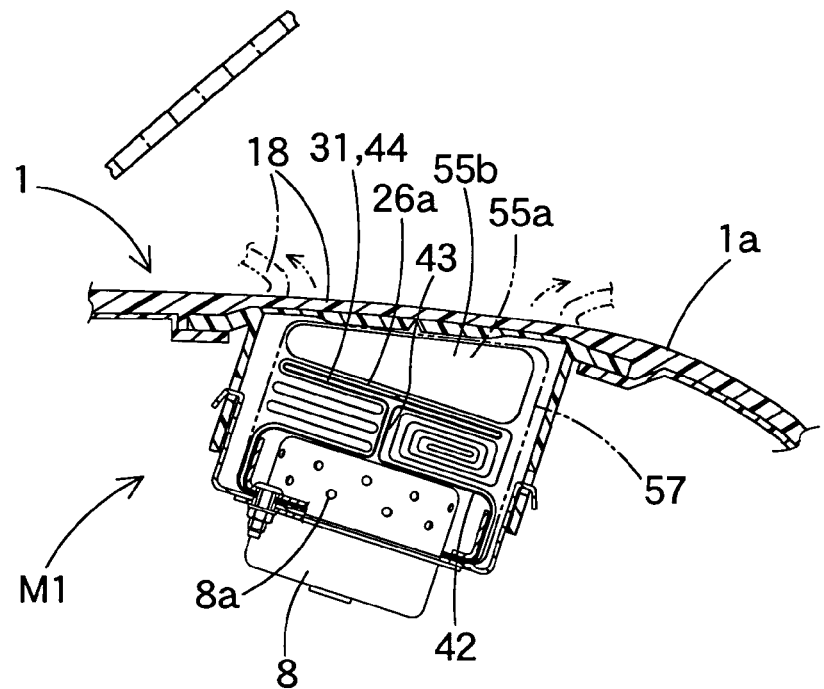
FIGS. 7A, 7B, 8A and 8B are schematic vertical sections illustrating behavior of the airbag device of FIG. 1 upon activation in order, taken along front-rear direction of vehicle.
Figure 7B:
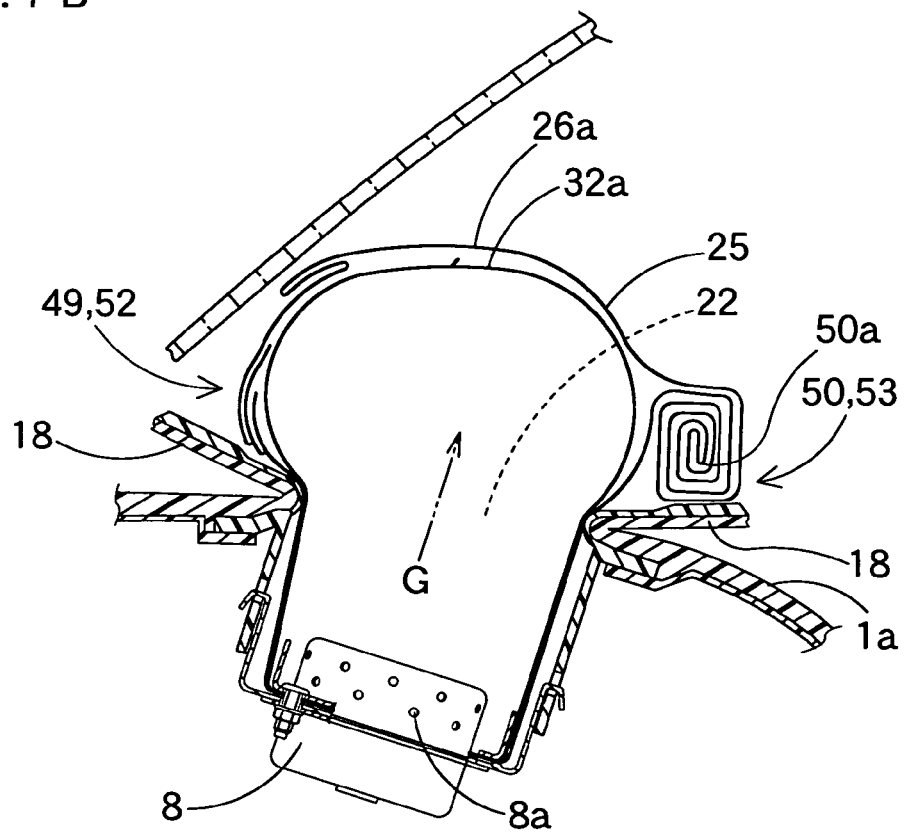
Figure 9A:
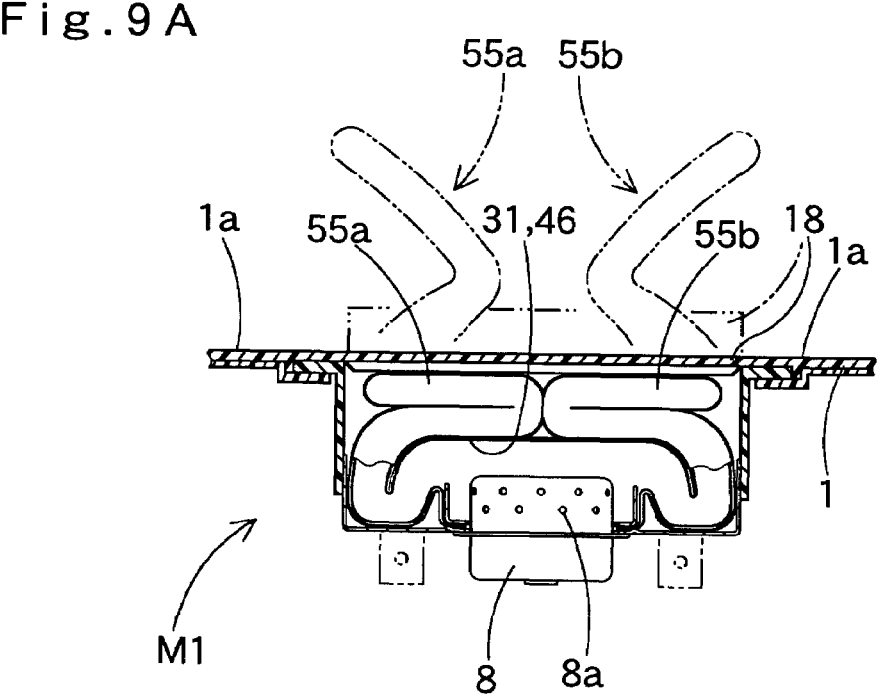
FIGS. 9A and 9B are schematic vertical sections illustrating behavior of the airbag device of FIG. 1 upon activation in order, taken along left-right direction of vehicle.
Figure 9B:
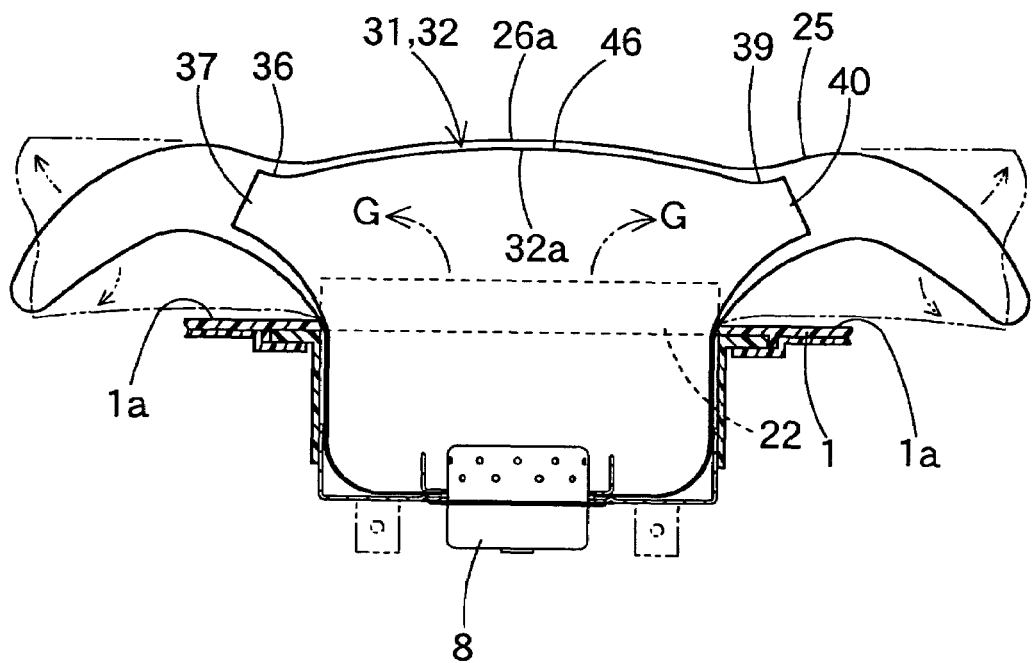

In the airbag device M1 of the first embodiment, when the folded and housed airbag 24 deploys with inflation gas G, inflation gas G flows from the upstream portion 42 of the flow regulating cloth 31 as an auxiliary bag to the downstream portion 44 via the joining portion 43, and thus inflates the upstream portion 42, the joining portion 43 and the downstream portion 44 in order. At this time, as shown in FIGS. 7A and 7B, the joining portion 43 of the auxiliary bag 31 joins the upstream portion 42 and the downstream portion 43 straightly, without being folded into folds of the fold masses 52 and 53 of the airbag body 25. Accordingly, the joining portion 43 is not affected by unfolding of the fold masses 52 and 53, but inflation gas G is instantly supplied to the downstream portion 44 from the upstream portion 42. Then the auxiliary bag 31 swiftly completes inflation while helping developing the bellows-folded left and right portions 55a and 55b of the transversely-folded body 55 of the airbag body 25. Consequently, the completely inflated auxiliary bag 31 supplies a great deal of inflation gas G to the airbag body 25 from the left and right outlet ports 37 and 40 of the downstream portion 44, so that the airbag body 25 is developed in left-right direction swiftly in the initial stage of inflation, as shown in FIGS. 7B and 9B, and as indicated by single-dotted lines in FIG. 11.

Moreover, when the airbag 24 is housed in vehicle, the downstream portion 44 of the auxiliary bag 31, with its circumferential wall developed flatly in two-ply state, is arranged to contact back face of the wall portion 26a of the airbag body 25 which is located ahead in deployment direction of the airbag 24. When the airbag body 25 is inflated, accordingly, the portion 26a contacting the downstream portion 44 of the auxiliary bag 31 is pushed and deploys quickly and widely. Due to this and swift development in left-right direction by inflation gas G emitted out of the outlet ports 37 and 40 of the completely inflated auxiliary bag 31, the airbag body 25 swiftly increases its volume in the initial stage of inflation. As a result, since internal pressure of the airbag body 25 is prevented from increasing in the initial stage of inflation, the airbag 24 protects a passenger O with its cushioning property in the initial stage of inflation, even if the passenger O is seated close to the dashboard.

Figure 8B:
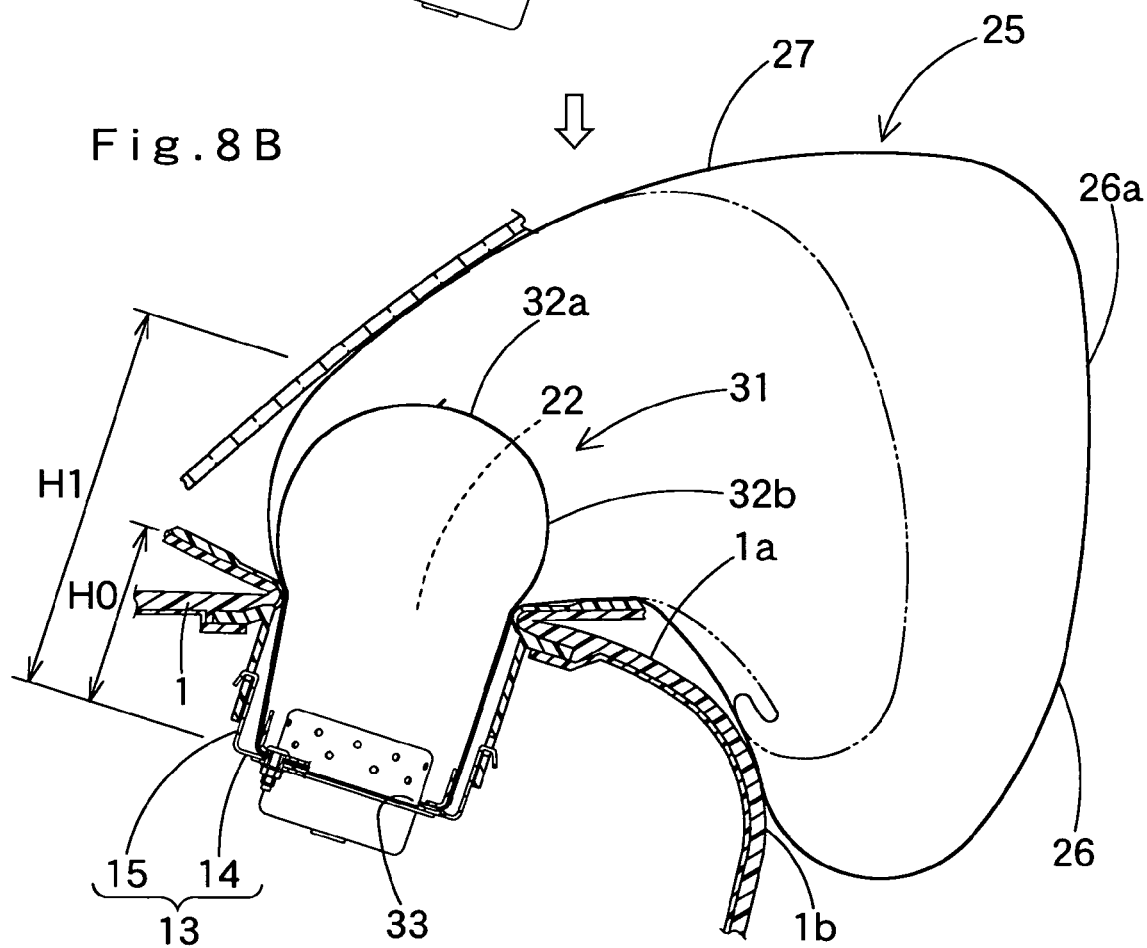

After the initial inflation, as aforementioned, the airbag 24 admits inflation gas G from the outlet ports 37 and 40 of the auxiliary bag 31, and completes inflation as indicated by double-dotted and triple-dotted lines in FIGS. 8B and 11.

Therefore, the airbag device M1 in the first embodiment protects a passenger O by suppressing increase of internal pressure in the initial stage of inflation and by developing the airbag 24 in a wide range, even if the passenger O seated close to the dashboard 1 comes over in the initial stage of inflation.

In the first embodiment, the portion 26a of the folded and housed airbag body 25 whose back face contacts with the downstream portion 44 of the auxiliary bag 31 is a face for protecting a passenger. The joining portion 43 of the auxiliary bag 31 is located between the fold masses 52 and 53 of the airbag body 25. In addition, the downstream portion 44 of the auxiliary bag 31 is disposed over both outer surfaces of the two fold masses 52 and 53.

With this construction, the wide portion 26a of the airbag body 25 for protecting a passenger, which is disposed over outer surfaces of the two fold masses, is swiftly inflated to secure thickness in deployment direction. Consequently, the airbag 24 securely protects the passenger O seated close to the dashboard 1 even if it engages him in the initial stage of inflation.

Since the joining portion 43 of the auxiliary bag 31 is located between the two fold masses 52 and 53, inflation gas G is guided in between the masses 52 and 53 from the upstream portion 42 toward the downstream portion 44 straightly. As a result, direction of inflation gas G is stabilized, so that the portion 26a of the airbag body 25 contacting the downstream portion 44 stably deploys with no error from airbag to airbag.

Moreover, since the joining portion 43 of the auxiliary bag 31 is located between the two fold masses 52 and 53, the joining portion pushes out the fold masses 52 and 53 due to inflation of itself, so that development of the masses 52 and 53 is promoted.

In the first embodiment, the auxiliary bag 31 is formed into a cylindrical shape extending in left-right direction with the inlet port 33 for inflation gas G located in transverse center in a lower side thereof. In front and rear of the inlet port 33 in a section taken along front-rear direction is each of the two fold masses 52 and 53, interposing the joining portion 43 of the auxiliary bag 31 therebetween. The front fold mass 52 is bellows-folded while the rear fold mass 53 is roll-folded downward and forward from the rear edge 50a.

With this construction, when the auxiliary bag 31 is inflated by inflation gas G in the initial stage of inflation of the airbag 24, the portion 26a where the downstream portion 44 of the auxiliary bag 31 is located inflates for protecting a passenger, and in addition, inflation gas G flows outward in left-right direction from the outlet ports 37 and 40 to inflate the airbag body 25 in left-right direction above the top face 1a of the dashboard 1, as shown in FIG. 9 and as indicated by single-dotted lines in FIG. 11. Accordingly, the airbag body 25 developed widely in left-right direction securely protects the passenger O seated close to the dashboard in the initial stage of inflation. Moreover, since the rear fold mass 53 is roll-folded downward and forward, in the course of unfolding, the rear fold mass 53 is developed along the top face 1a of the dashboard 1 while inflating. Accordingly, the fold mass 53 smoothly enters into a narrow gap between the rear face 1b (refer to FIGS. 8A and 8B) and the passenger O, so that the airbag 24 is suitably used for a front passenger's seat.

Figure 18:
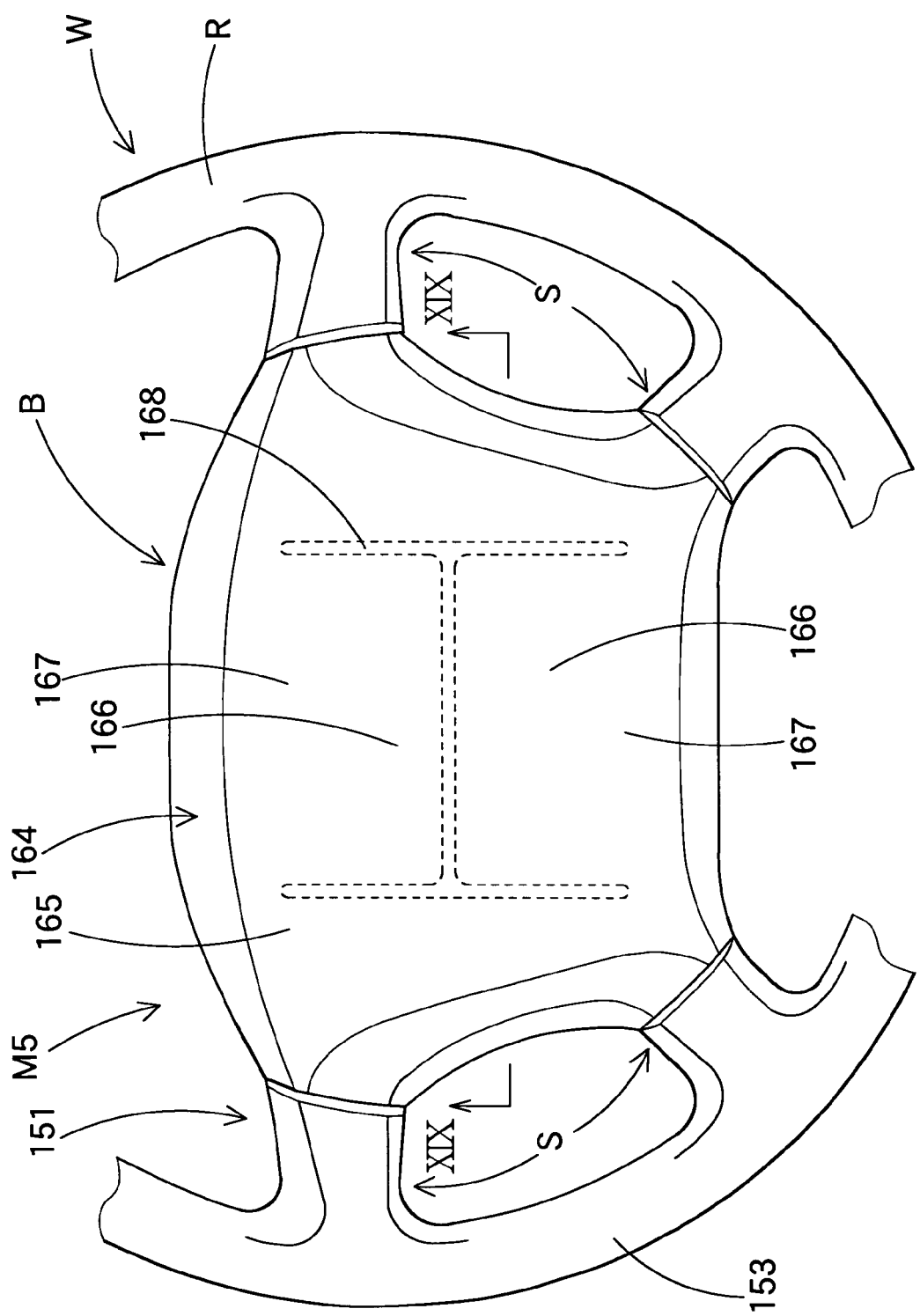
FIG. 18 a partial plan view of a steering wheel of an airbag device for driver's seat according to a fifth embodiment of the present invention.
Figure 19:
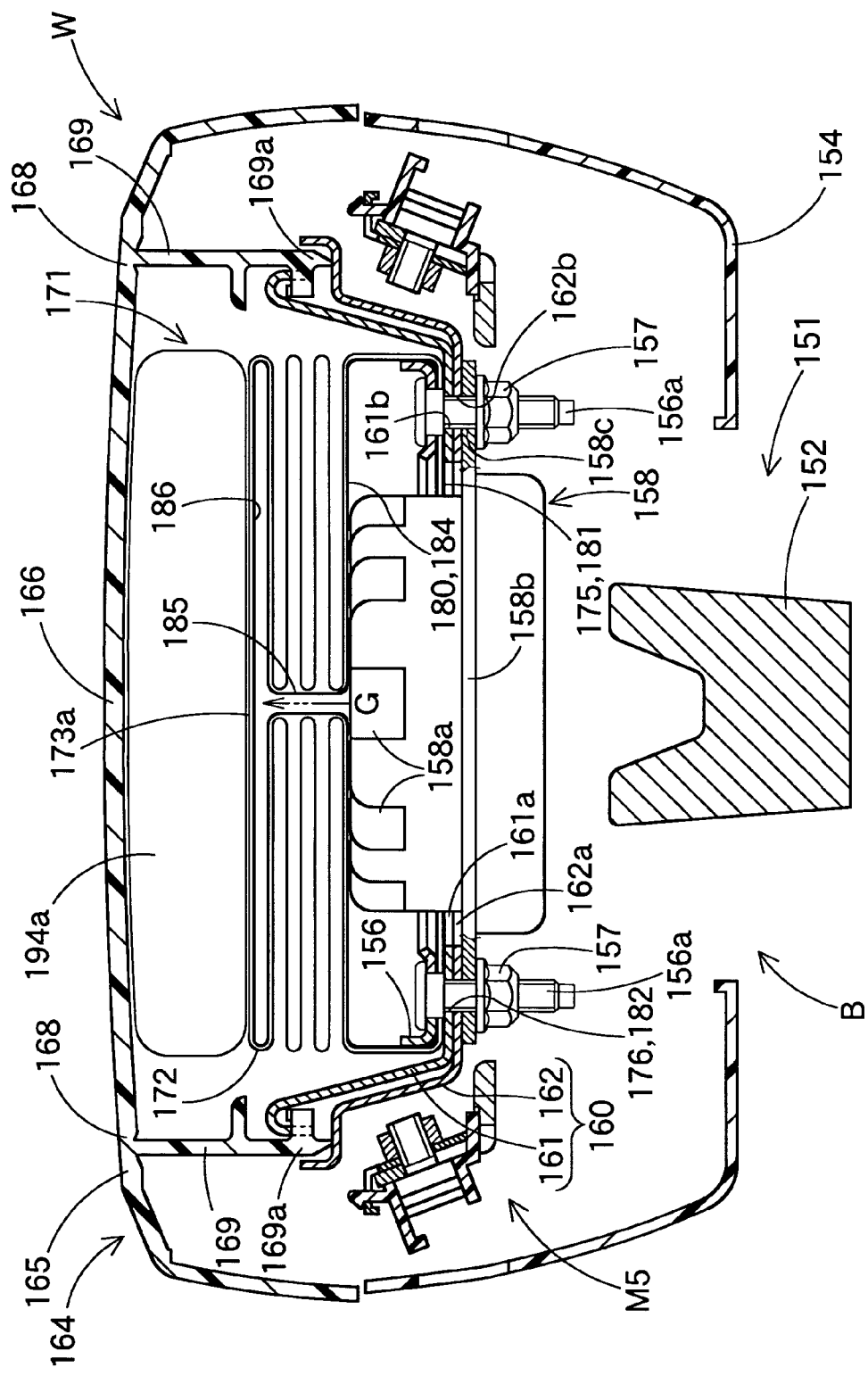
FIG. 19 is a schematic enlarged vertical section of the airbag device of FIG. 18, taken along line XIX-XIX in FIG. 18.

FIGS. 18 to 24 illustrate a fifth embodiment of the airbag device according to the present invention. This is an airbag device M5 for driver's seat mounted on a boss B of steering wheel W in front of driver's seat. Referring to FIGS. 18 and 19, the airbag device M5 is arranged at upper side of the boss B at the center of the steering wheel W. The steering wheel W includes a ring R, the boss B and four spokes S. The ring R is for holding at the time of steering operation. The boss B is disposed at the center of the steering wheel W and is joined with a steering shaft SS (refer to FIG. 24). Each of the spokes S connects the ring R and the boss B. The steering wheel W includes, as constituent parts, the airbag device M5 and a steering wheel body 151.

Unless otherwise specified, front-rear, up-down, and left-right directions in the fifth embodiment are based on the steering wheel W mounted on a vehicle and being steered straight forward. Specifically, up-down is defined by up-down along the axial direction of the steering shaft SS with which the steering wheel W is to be assembled. Front-rear is defined by vehicle's front-rear direction which is perpendicular to the axial direction of the steering shaft SS, and left-right is defined by vehicle's left-right direction which is perpendicular to the axial direction of the steering shaft SS.

The steering wheel body 151 includes a steering wheel core 152, a covering layer 153 and a lower cover 154. The core 152 is made from aluminum alloy or the like and is constructed to connect each of the ring R, the boss B and the spokes S. The covering layer 153 is made from synthetic resin and covers the core 152 of the ring R and the spokes S at side of the ring R. The lower cover 154 is made from synthetic resin and is disposed below the boss B.

As shown in FIG. 19, the airbag device M5 includes a folded airbag 171, an inflator 158 for supplying the airbag 171 with inflation gas, a pad or an airbag cover 164 for covering the folded airbag 171, and a bag holder or a case 160 for holding the airbag 171 and the inflator 158.

As the inflator 8 of the first embodiment, the inflator 158 is generally columnar in shape, and is provided at upper side thereof with a plurality of gas discharge ports 158a for discharging inflation gas. The inflator 158 also includes a flange 158b projected from outer circumference thereof in a generally square annular shape. The flange 158b has insert holes 158c for inserting through bolts 156a protruded from four corners of a retainer 156 having a square annular shape. As the retainer 10 in the first embodiment, the retainer 156 made of sheet metal is adapted to attach the airbag 171 and the inflator 158 to the bag holder 160.

The bag holder 160 includes a holder plate 161 opened upward and having a generally rectangular parallelpiped shape, and a backup plate 162 also having a rectangular parallelpiped shape. The holder plate 161 and the backup plate 162 cooperatively hold retaining portions 169a located at lower end of joint wall 169 of the pad 164. Each of the plates 161 and 162 has an aperture 161a/162a for inserting an upper part of the inflator 158 from lower side thereof, and insert holes 161b/162b arranged around the aperture 161a/162a to insert the bolts 156a of the retainer 156 therethrough. The backup plate 162 is provided with unillustrated brackets to be connected to the core 152 of the steering wheel body 151.

The pad 164 includes a lid 165 for covering over the boss B, and a joint wall 169 protruded downward from lower surface of peripheral edge of the lid 165 in a generally square cylindrical shape. The lid 165 is provided in a portion defined by the joint wall 169 with two doors 166 openable toward front and rear directions of the steering wheel W when the airbag 171 expands. Around the doors 166 is a thinned breakable portion 168 having an H-shape as viewed from above. The breakable portion 168 helps open the doors 166 smoothly by being broken when pushed by the airbag 171. Portions connecting front ends and rear ends of left and right lines of H-shape of the breakable portion serve as hinge lines 167 which the front and rear doors 166 open around. The joint wall 169 is clamped at the lower end by the holder plate 161 and the backup plate 162, and thus is held by the bag holder 160.

Figure 20:
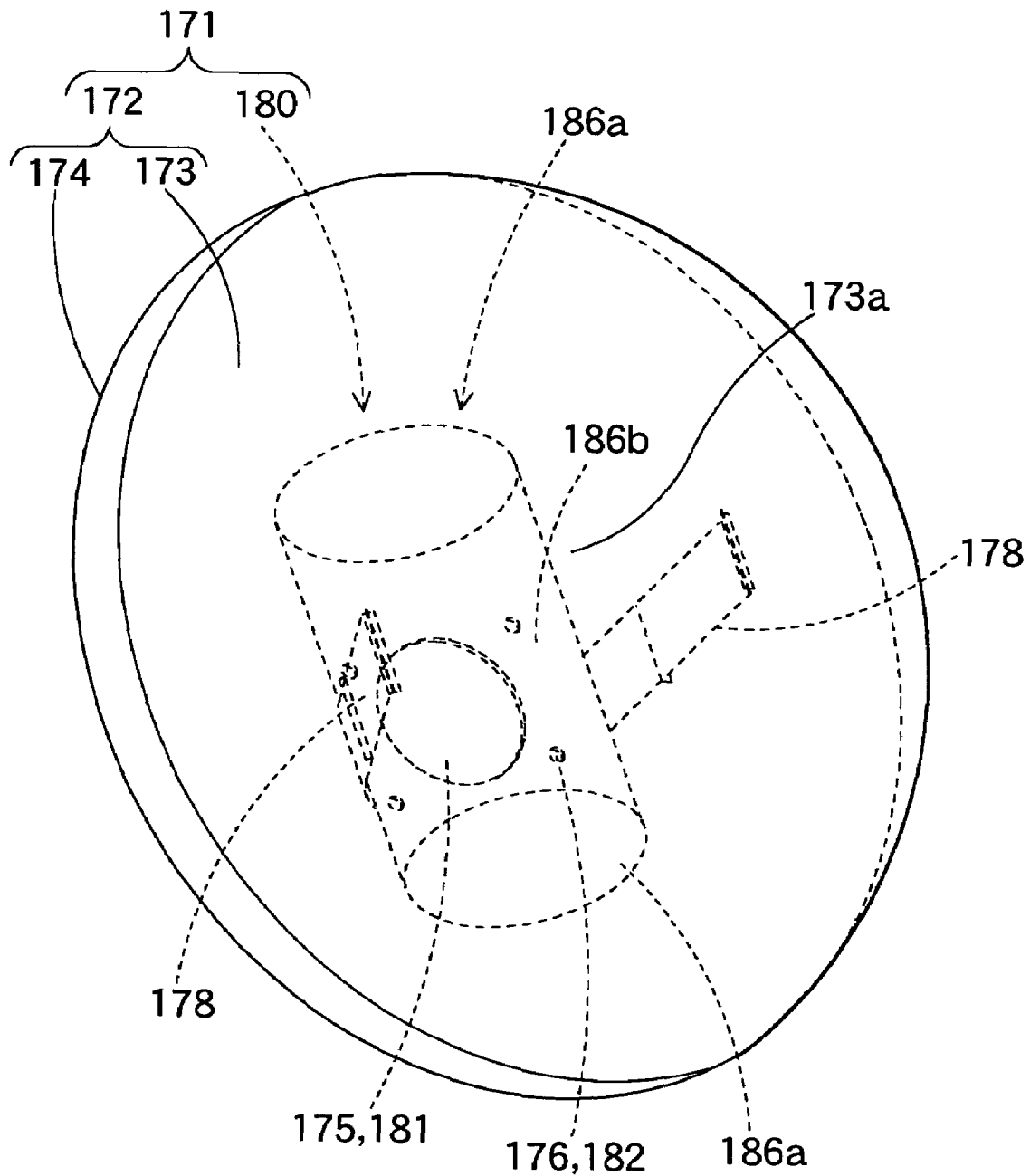
FIG. 20 is a perspective view of an airbag employed in the fifth embodiment, as inflated by itself.

Referring to FIG. 20, the airbag 171 includes an airbag body 172 to inflate in a spherical shape with inflation gas, and an auxiliary bag 180 inserted within the airbag body 172. The airbag body 172 and the auxiliary bag 180 are also formed of flexible woven fabric of polyamide or the like, as the airbag 24 in the first embodiment.

The airbag body 172 includes a driver's side wall 173 disposed toward a driver D as occupant upon deployment, and a body side wall 174 disposed at side of the steering wheel body 151. Both of the driver's side wall 173 and the body side wall 174 are formed into circular shape, and sewn to each other at outer edge to form the airbag body 172. At the center of the body sidewall 174 is around gas inlet port 175 for setting-in an upper part of the inflator 158 from lower side.

Around the gas inlet port 175 are four mounting holes 176 for inserting the bolts 156a of the retainer 156 therethrough. The airbag body 172 is further provided at each left and right side of the gas inlet port 175 with a tether 178. Each of the tethers 178 is adapted to regulate thickness of the inflated airbag 171 by connecting the vicinity of central portion 173a of the driver's side wall 173, which confronts the gas inlet port 175 above the inlet port 175, and the periphery of the inlet port 175 in the body side wall 174. Each of the tethers 178 is formed by joining leading ends of cloth members each of which is connected with the wall 173 and 174.

The auxiliary bag 180 has a cylindrical shape extending in front-rear direction, and includes an inlet port 181 for inflation gas G in longitudinal center of lower side thereof. The inlet port 181 is communicated with the gas inlet port 175 of the airbag body 172. Around the inlet port 181 are mounting holes 182 corresponding to the mounting holes 176 for inserting the bolts 156a of the retainer 156 therethrough. Inner diameter of the auxiliary bag 180 is predetermined such that an upper end portion 186b confronting the inlet port 181 above the inlet port 181 when the airbag 180 is completely inflated is disposed above the pad 164 with the doors 166 open, and is disposed above top face of the ring R of the steering wheel W.

Figure 21C:
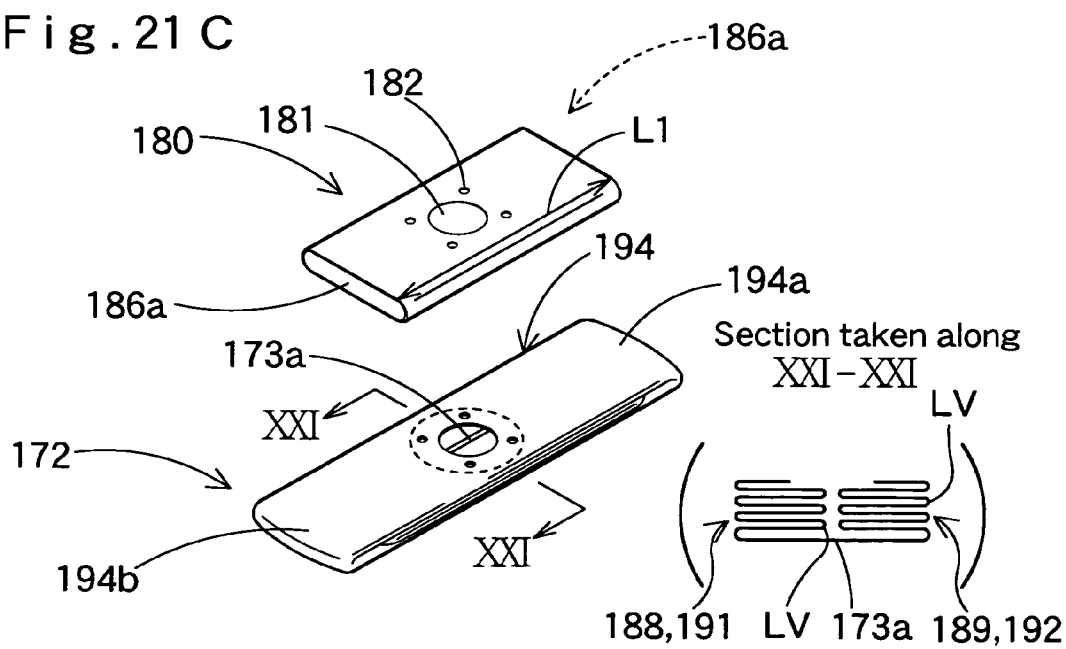
Figure 22A:
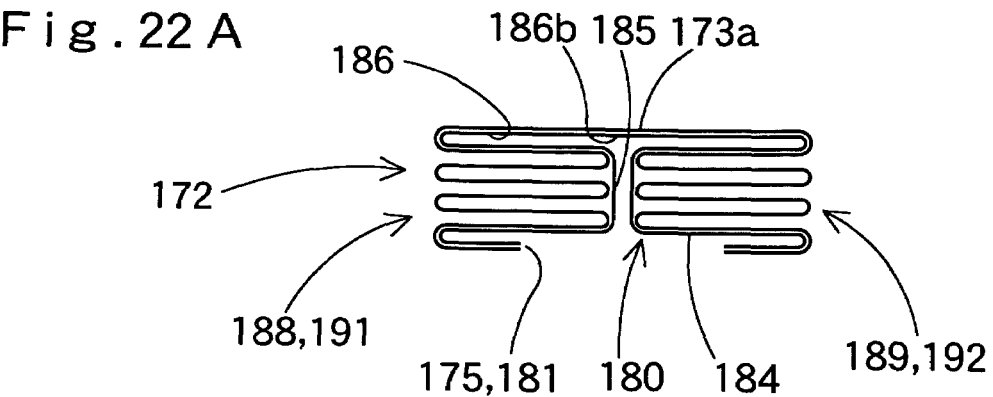
Figure 22B:
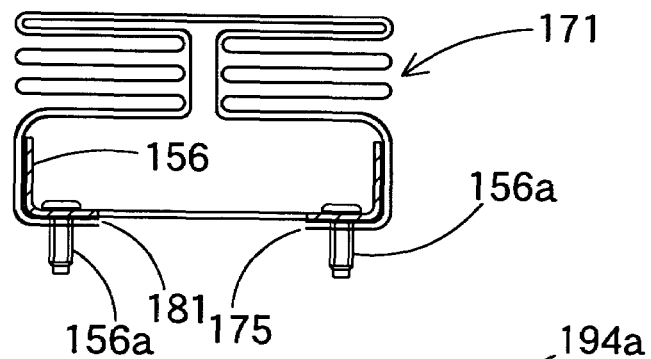
Figure 22C:
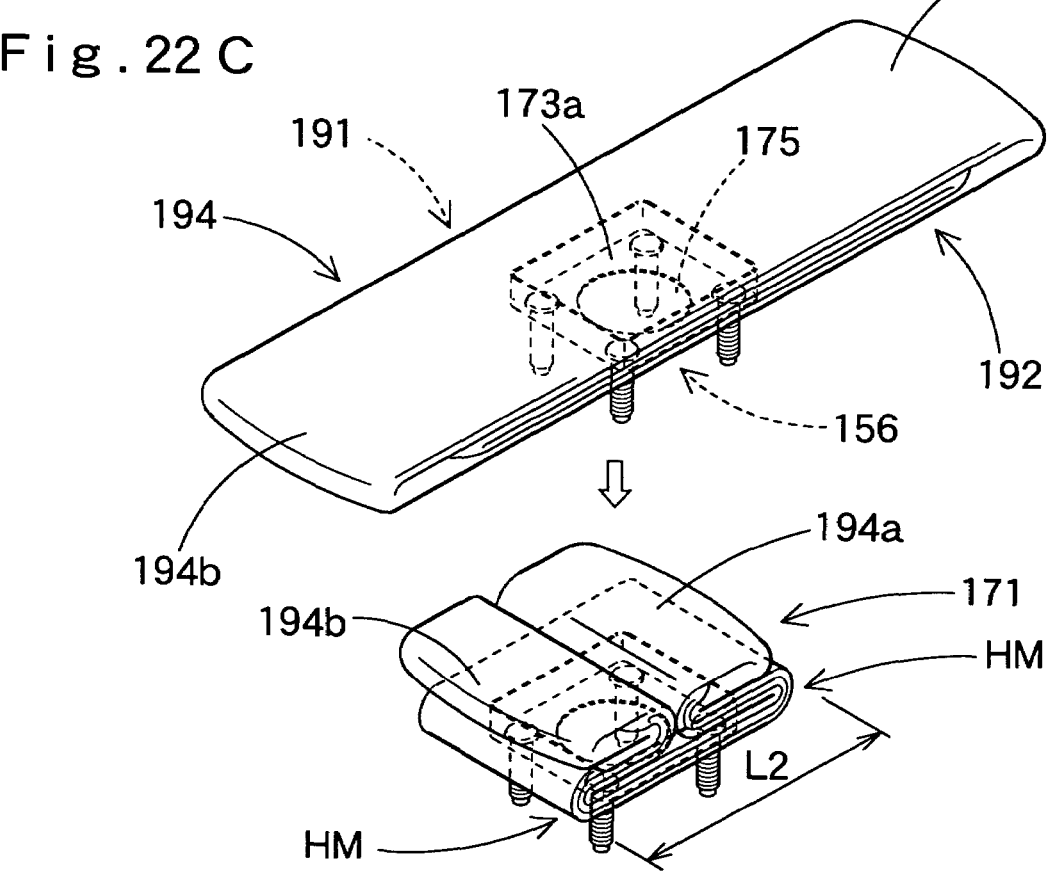
Figure 23:
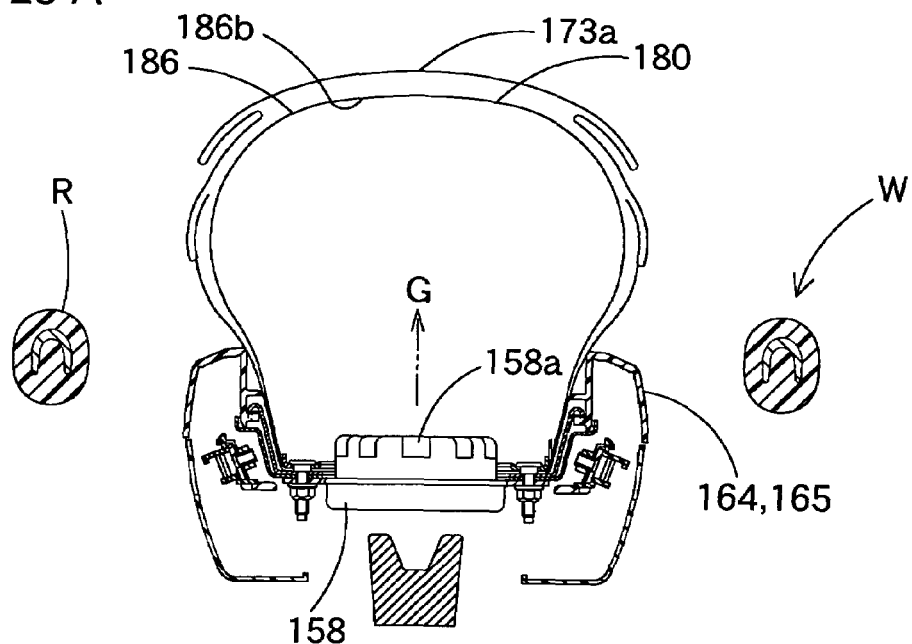
FIGS. 23A and 23B are schematic vertical sections illustrating the airbag device of FIG. 18 in service in order.
Figure 23:
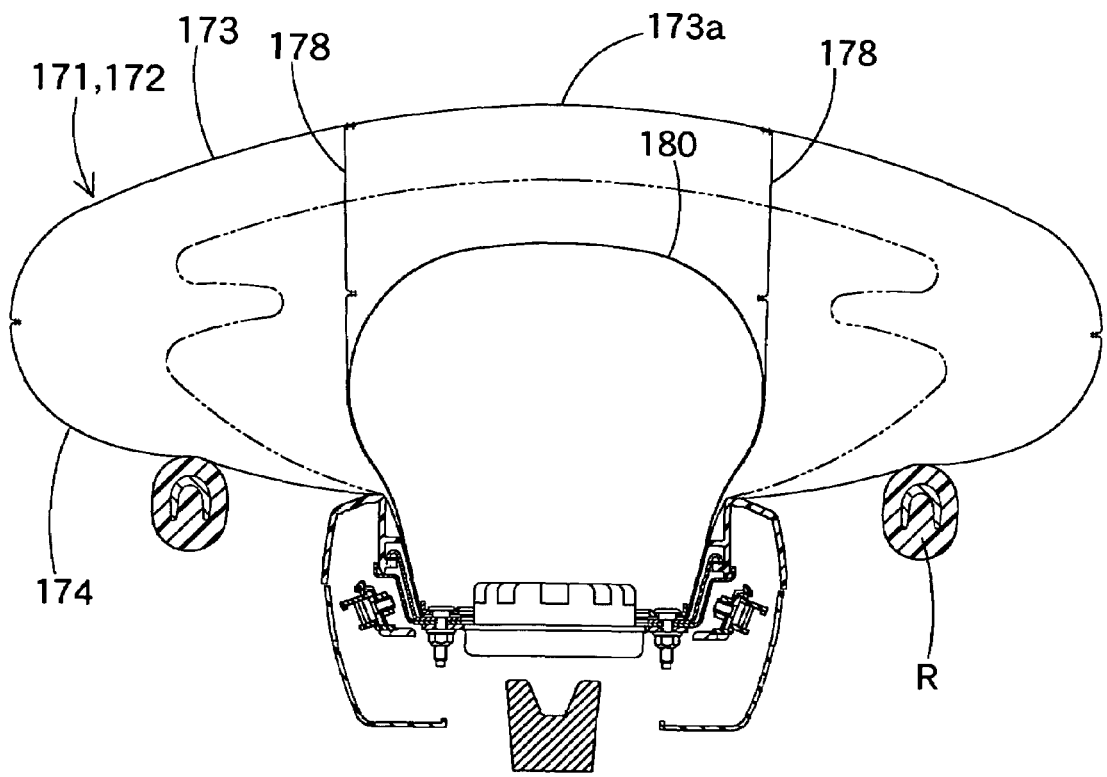

Longitudinal length L1 of the auxiliary bag 180 (refer to FIG. 21C) is predetermined such that the bag 180 may not abut against the walls 173 and 174 to be bent when the airbag 171 is completely inflated, and predetermined to be longer than a dimension of the bag holder 160 in front-rear direction, and in addition, to be longer than width L2 of the completely folded-up airbag 171 in front-rear direction, as shown in FIG. 22C. To be more detailed, the length L1 is greater than a distance L2 between front and rear crest folds HM closest to the retainer 156 out of bellows-folds of the airbag 171 extending along left-right direction, and allows the bag 80 to be folded up over the transverse folds HM. Moreover, the length L1 is constructed such that front and rear openings 186a protrude upward from the boss B when the airbag 171 is completely inflated.

When the airbag 171 is folded and housed in the bag holder or the case 160, the auxiliary bag 180 has a gas upstream portion 184, a gas downstream portion 186, and a joining portion 185 that joins the upstream portion 184 and the downstream portion 186, in a section taken along deployment direction of the airbag 171 from the inlet port 33, i.e., in a section taken along front-rear direction of vehicle via the inlet port 181, as shown in FIG. 19. More specifically, since the auxiliary bag 180 is inflated in a generally annular shape in a section taken along left-right direction when the airbag 171 is completely inflated, in a section taken along left-right direction of the inlet port 181, the gas upstream portion 184 stands for a lower circumferential wall around the inlet port 181, the downstream portion 186 stands for an upper circumferential wall located above the inlet port 181 and confronting the port 181, and the joining portion 185 stands for circumferential walls confronting in left-right direction between the upper and lower circumferential walls.

In FIG. 19, a portion of the airbag body 172 designated by reference numeral 194a located above the downstream portion 186 is a front portion out of front and rear portions of vertically-folded body 194 (refer to FIG. 22C) which are bellows-folded and placed above the gas inlet port 181. This front portion 194a is not shown as section, in FIG. 22, together with a rear portion 194b (refer to FIG. 22C), in a section taken along left-right direction of vehicle via the inlet port 181 as the folded airbag 171 is housed in the bag holder 160.

In the fifth embodiment, too, the joining portion 185 of the auxiliary bag 180 is disposed around or between fold masses 191 and 192 of the airbag body 172, not folded into folds of the masses 191 and 192, so that the joining portion 185 joins the upstream portion 184 and downstream portion 186 straightly.

Moreover, the downstream portion 186 of the auxiliary bag 180 is arranged generally perpendicularly to the joining portion 185 in a flattened two-ply state, and is laid out to contact back face of a wall portion 173a of the airbag body 172 which is located ahead in deployment direction of the airbag 171, as shown in FIGS. 19 and 22A. In this embodiment, too, the downstream portion 186 is disposed over both outer surfaces (or on top faces) of the two fold masses 191 and 192 of the folded and housed airbag body 172.

Figure 21A:
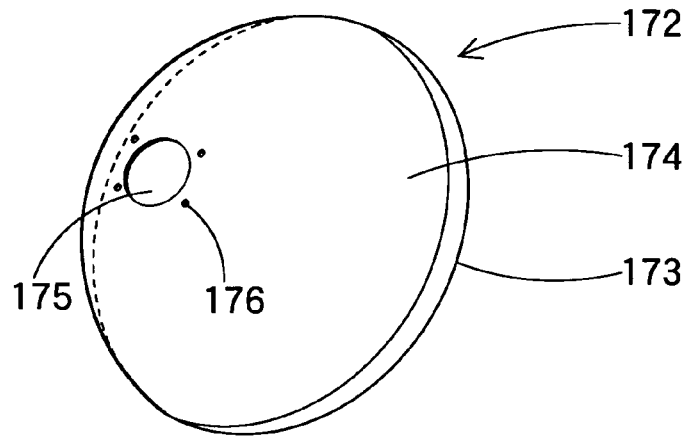
FIGS. 21A, 21B, 21C, 22A, 22B and 22C illustrate a folding process of the airbag of FIG. 20 in order.
Figure 21B:
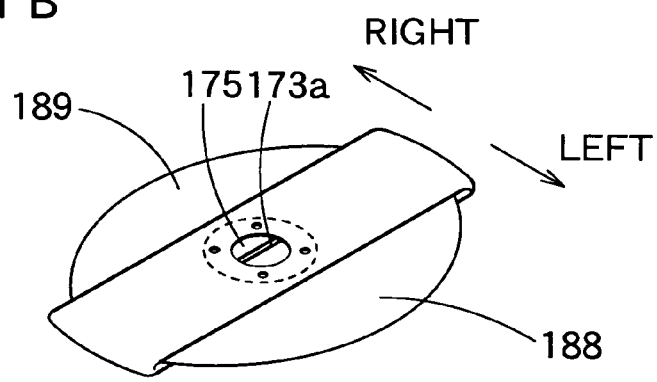

To assemble the airbag device M5 for driver's seat, the airbag 171 is folded up firstly, as shown in FIGS. 21A to 21C, from flatly developed state with the driver's side wall 173 and the body side wall 174 overlaid on each other. By this point, the airbag body 172 has been formed into a bag shape and provided with tethers 178 inside thereof. Left and right portions 188 and 189 interposing the inlet port 175 therebetween thereof are folded on valley folds LV extending along front-rear direction, so that the walls 173 and 174 are folded into the airbag body 172 to pile vertically. In other words, left and right fold masses 191 and 192 are formed by reducing transverse width of the airbag body 172, thereby providing a vertically-folded body 194 of the airbag body 172.

Thereafter, as shown in FIGS. 21C and 22A, the auxiliary bag 180 which has been formed into a cylindrical shape in advance is put into the airbag body 172 from the inlet port 175, and the inlet port 181 and mounting holes 182 are matched with the gas inlet port 175 and mounting holes 176 of the airbag body 172. At the same time, the upstream portion 184 in the periphery of the inlet port 181 of the auxiliary bag 180 is laid out over the left and right portions 188 and 189 which is located around the inlet port 175 in the interior of the airbag body 172. The joining portion 185 is located between the fold masses 191 and 192, and then the downstream portion 186 is flatly developed and placed between the top faces of the fold masses 191 and 192 and back face of the portion 173*a* located in the vicinity of the center of the passenger's side wall 173.

Thereafter, as shown in FIG. 22B, the retainer 156 is inserted into the airbag 171 via the inlet ports 175 and 181 so that the bolts 156*a* may be protruded out of the airbag 171 from the mounting holes 176 and 182. Then the front and rear portions 194*a* and 194*b* are bellows-folded on folds extending along left-right direction, as shown in FIG. 22C. The airbag 171 thus folded is wrapped by an unillustrated breakable wrapping sheet, to keep the folded-up configuration.

Then, the folded airbag 171 is located on the holder plate 161 of the bag holder 160 by inserting the individual bolts 156*a* of the retainer 156 protruded from the folded airbag 171 through the insert holes 161*b* of the holder plate 161.

Subsequently, the pad 164 is placed over the airbag 171, so that the holder plate 161 is retained by the retaining portion 169*a* of the joint wall 169 of the pad 164. Then the backup plate 162 is located below the holder plate 161 so that the retaining portion 169*a* is clamped by the holder plate 161 and the backup plate 162, and the pad 164 is held by the bag holder 160. At this time, the bolts 156*a* of the retainer 156 are inserted through the insert holes 162*b* of the backup plate 162.

Thereafter, an upper part of the inflator 158 is inserted into the apertures 161*a*, 162*a* and the inlet ports 175 and 181 from lower side, and the bolts 156*a* are protruded downward from the mounting holes 158*c* of the flange 158*b* of the inflator 158. If nuts 157 are fastened with the bolts 156*a*, the airbag 171, the bag holder 160, the inflator 158 and the pad 165 are assembled, so that the airbag device M5 is complete.

If the core 152 of the boss B of the steering wheel body 151 is secured to the steering shaft SS, the airbag device M5 is attached to the steering wheel W, utilizing not-shown brackets of the bag holder 160.

If inflation gas is discharged from the gas discharge ports 158*b* of the inflator 158 after the mounting of the steering wheel W on vehicle, the folded airbag 171 breaks the breakable portion 168 of the pad 164 and opens the doors 166. Then the airbag 171 protrudes from the opening 165*a* provided by opening of the doors 166 and inflates largely.

Figure 24A:
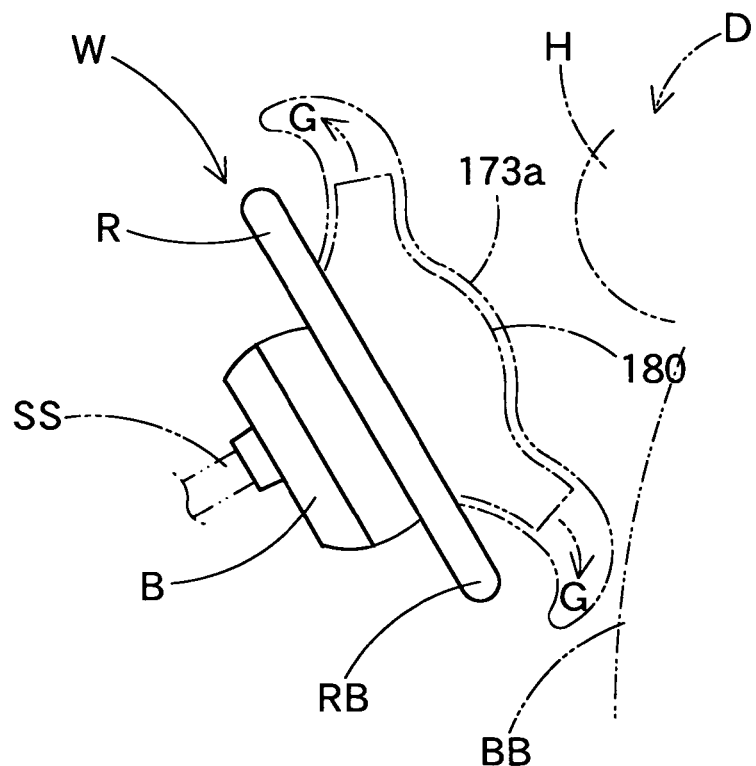
FIGS. 24A and 24B are schematic side views illustrating the airbag device of FIG. 18 in service in order.

In the airbag device M5, too, the joining portion 185 of the auxiliary bag 180 joins the upstream portion 184 and the downstream portion 186 straightly, without being folded into folds of the fold masses 191 and 192 of the airbag body 172. Accordingly, when the auxiliary bag 180 inflates in the initial stage of inflation of the airbag 171, the joining portion 185 is not affected by unfolding of the fold masses 191 and 192, but instantly supplies inflation gas G to the downstream portion 186 from the upstream portion 184, as shown in FIGS. 19, 23A and 24A. Then the auxiliary bag 180 swiftly completes inflation while helping developing the front ant rear bellows-folded portions 194*a* and 194*b* of the vertically-folded body 194 of the airbag body 172. Consequently, the completely inflated auxiliary bag 180 supplies a great deal of inflation gas G to the airbag body 172 from the openings 186*a* and 186*b* located in front and rear ends of the downstream portion 186, so that the airbag body 172 is developed in front-rear direction swiftly in the initial stage of inflation, as shown in FIG. 24A.

Moreover, when the airbag 171 is housed, the downstream portion 186 of the auxiliary bag 180, with its circumferential wall developed flatly in two-ply state, is arranged to contact back face of the wall portion 173*a* of the airbag body 172 which is located ahead in deployment direction of the airbag 171. When the auxiliary bag 180 is inflated, accordingly, the portion 173*a* contacting the downstream portion 186 is pushed and deploys quickly and widely. Due to this and swift development by inflation gas G emitted from the openings 186*a* and 186*b* of the completely inflated auxiliary bag 180, the airbag body 172 swiftly increases its volume in the initial stage of inflation, as shown in FIGS. 23A and 24A. As a result, internal pressure of the airbag body 172 is suppressed in initial stage of inflation, so that the airbag 171 protects a driver D with its cushioning property, even if it engages head H of the driver D in the initial stage of inflation.

Therefore, the airbag device M5 in the fifth embodiment swiftly develops the airbag 171 in a wide range while suppressing increase of internal pressure in the initial stage of inflation, and protects the driver D even if the head of driver D seated close to the steering wheel W comes close in the initial stage of inflation.

In the airbag device M5 for driver's seat in the fifth embodiment, too, the housed airbag body 172 includes a portion 173*a* whose back face contacts with the downstream portion 186 of the auxiliary bag 180, and this contacting portion is the central portion 173*a* of a face 173 for protecting a driver upon deployment. The joining portion 185 of the auxiliary bag 180 is located between the fold masses 191 and 192 of the folded and housed airbag body 172. In addition, the downstream portion 186 is disposed over both outer surfaces (on top faces) of the two fold masses 191 and 192. In other words, the wide face 173*a* of the face 173 for protecting a head H of driver D is provided on top faces of the fold masses 191 and 192, and the downstream portion 186 is located to push up the face 173*a*.

With this construction, upon inflation of the auxiliary bag 180, the downstream portion 186 pushes up the wide face 173*a* swiftly, so that a head protection area of the airbag body 172 expands while securing thickness upward, i.e. in deployment direction. Consequently, the airbag 171 securely protects the head H of driver D even if it engages it in the initial stage of inflation.

Since the joining portion 185 of the auxiliary bag 181 is located between the two fold masses 191 and 192, inflation gas G is guided in between the masses 191 and 192 toward the downstream portion 186 straightly from the upstream portion 184, as in the first embodiment. As a result, direction of inflation gas G is stabilized, so that the portion of the airbag body 172 contacting the downstream portion 186 stably deploys with no error from airbag to airbag.

Moreover, since the joining portion 185 is located between the two fold masses 191 and 192, the joining portion 185 pushes out the fold masses 191 and 192 due to inflation of itself, so that development of the masses 191 and 192 is promoted, as in the first embodiment.

In the fifth embodiment, moreover, the auxiliary bag 180 is formed into a cylindrical shape extending in front-rear direction, and includes the openings 186*a* and 186*b* in front and rear ends thereof, and the gas inlet port 181 in longitudinal center in the lower side. In left and right sides of the joining portion 185 is each of the two fold masses 191 and 192, and the joining portion 185 joins the upstream portion 184 and the downstream portion 186 straightly.

Figure 24B:
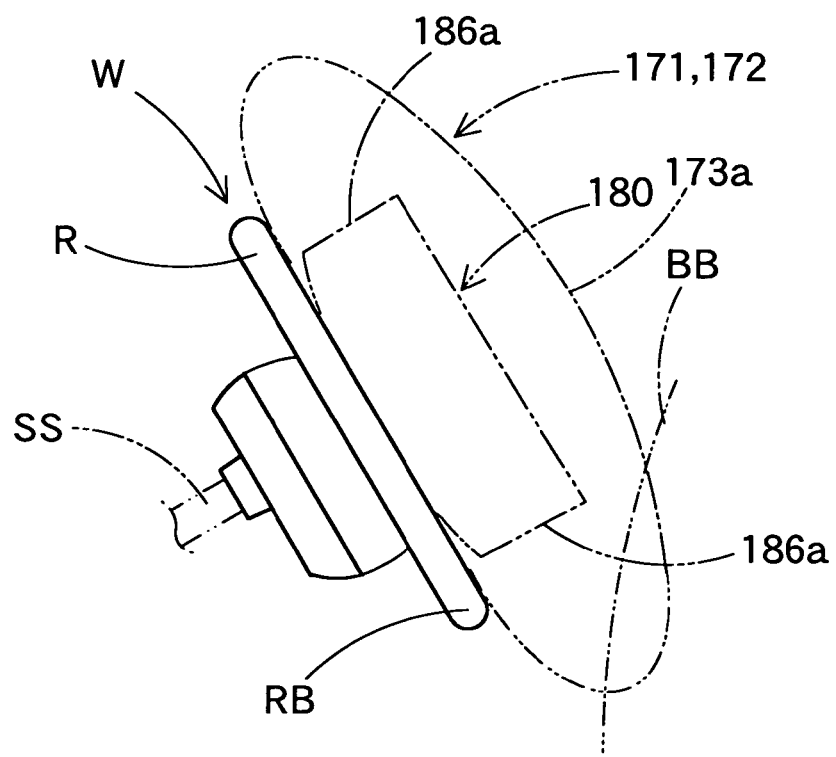

With this construction, when the auxiliary bag 180 is inflated by inflation gas G flowing from the inlet port 181 in the initial stage of inflation of the airbag 171, the portion 173*a* where the downstream portion 186 of the auxiliary bag 180 is located inflates for protecting the driver D. Meanwhile, inflation gas G flows out from the openings 186*a* and 186*b* in front and rear directions, so that the airbag body 172 inflates above the boss B of the steering wheel W elongatively in front-rear direction. As a result, as shown in FIGS. 24A and 24B, the airbag 171 smoothly deploys between abdomen BB of the driver D, which engages the airbag 171 in the initial stage of inflation, and a rear part RB of the ring R of the steering wheel W even if the driver D is seated close to the steering wheel W. Although the airbag 171 is elongate in front-rear direction in the initial stage of inflation, its transverse width is reduced. Accordingly, as shown in FIGS. 23A and 23B, the airbag 171 does not strongly press left and right arms of the driver D holding the ring R.

Figure 25:
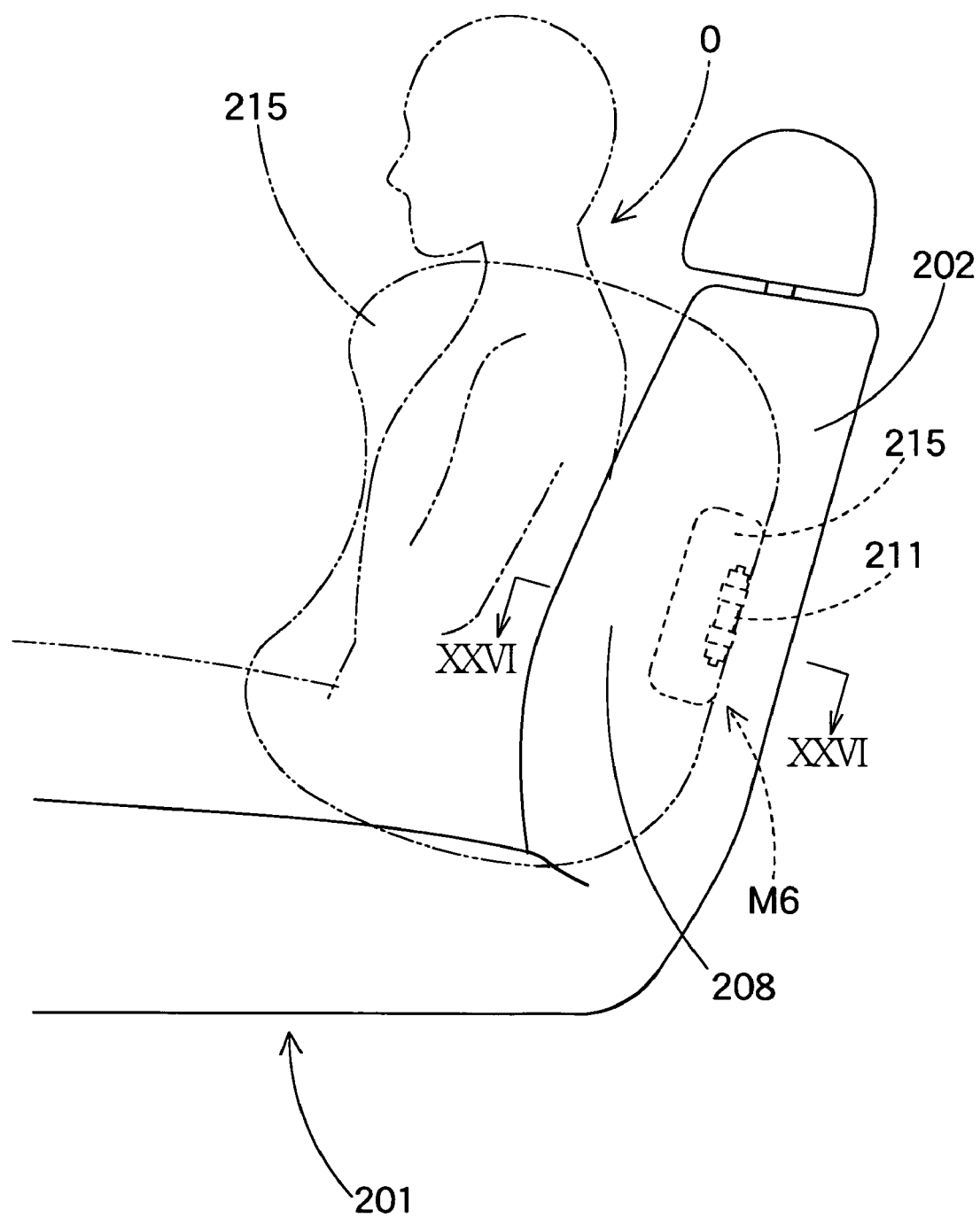
FIG. 25 is a side view of a seat on which a side impact airbag device of a sixth embodiment is mounted.
Figure 26:
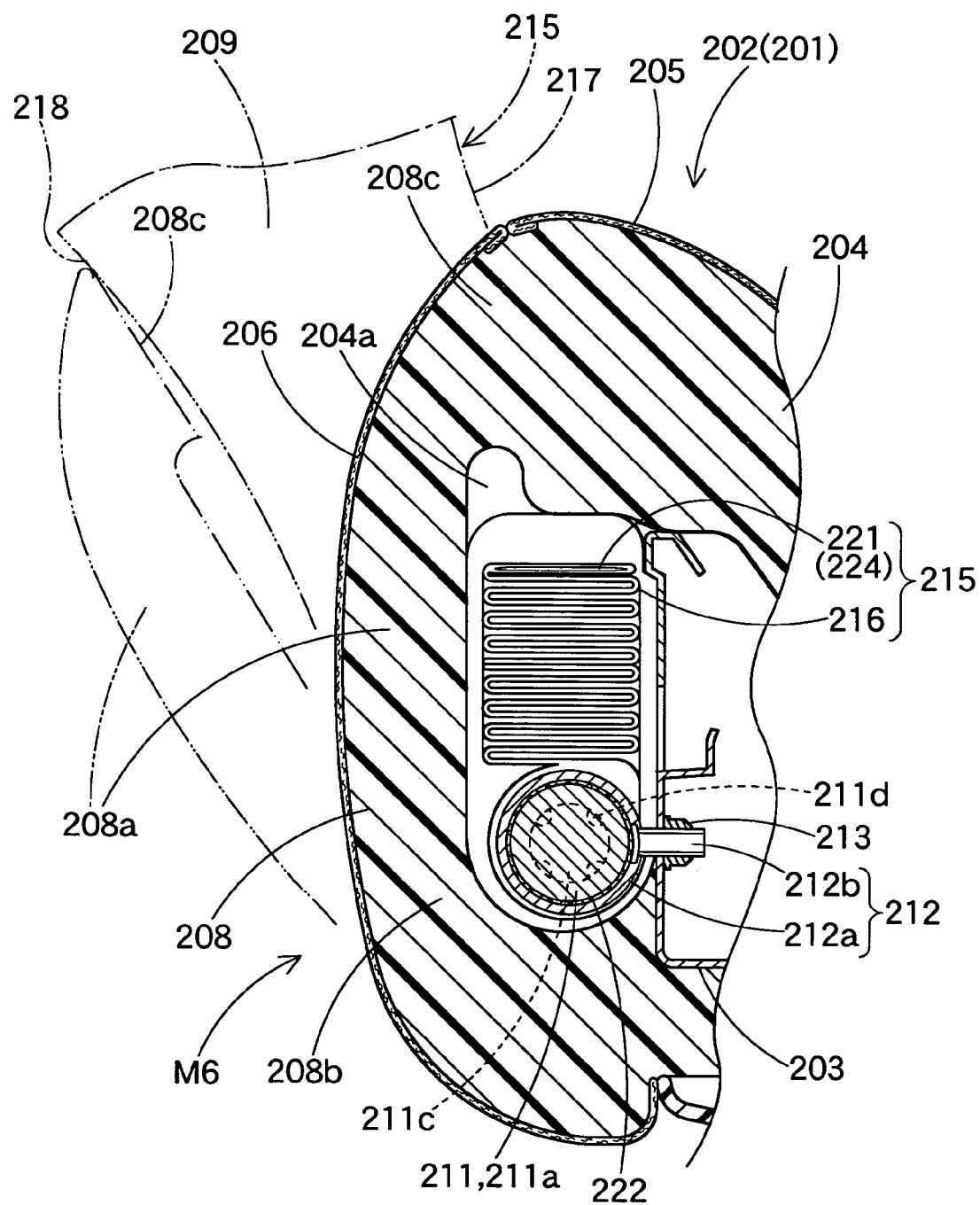
FIG. 26 is a schematic cross section of the airbag device of the sixth embodiment in service, taken along line XXVI-XXVI of FIG. 25.

FIGS. 25 and 26 illustrate an airbag device of a sixth embodiment of the present invention. This airbag device M6 is a side impact airbag attached to vehicle's outer side of back rest 202 of seat 201.

Front-rear, up-down and left-right of the sixth embodiment correspond to front-rear, up-down and left-right of vehicle on which the airbag device M6 is mounted.

The back rest 202 includes a seat frame 203 disposed generally vertically. The side impact airbag device M6 is secured to the frame 203 and is enclosed by cushion 204 which extends from front face of the back rest 202. The device M6 is secured to the frame 203 by bolt 212*b* fixing with nuts 213. The bolts 212*b* project from mounting brackets 212 for holding an inflator 211. Reference numerals 205 and 206 designate surface skins for covering outer surface of the cushion 204, which are made of decoration fabric or the like.

The side impact airbag M6 includes a folded airbag 215, an inflator 211 housed in the airbag 215 for supplying the same with inflation gas, and an airbag cover 208 for covering the folded airbag 215 and to be pushed by the inflated airbag 215 and opened.

The airbag cover 208 is constructed of outer parts of the cushion 204 and the surface skin 206. The airbag cover 208 includes a door 208*a* that opens when pushed by the inflating airbag 215. The door 208*a* opens around its rear end or a hinge portion 208*b* and directs its front end outward of vehicle. In front end of the door 208*a* is a breakable portion 208*c*. The breakable portion 208*c* is located in the vicinity of border of outer side and front face of the cushion 204, and is formed by a recess 204*a* which recesses forward. Upon inflation, the airbag 215 pushes the door 208*a* and breaks the breakable portion 208*c*, and then the door 208*a* opens outward of vehicle around the hinge portion 208*b*, which provides an opening 209. The airbag 215 protrudes forward from this opening 209. When the door 208*a* opens, the surface skin 206, which was sewn to the surface skin 205, is separated from the surface skin 205 since sewing yarn is broken.

Referring to FIGS. 26 to 29, the inflator 211 is formed into a cylindrical shape, and includes a columnar great diameter portion 211*a* and small diameter portions 211*b* and 211*c* each located in upper and lower end of the great diameter portion 211*a*. The great diameter portion 211*a* is arranged along the seat frame 203 generally vertically. Both of the small diameter portions 211*b* and 211*c* are provided with a plurality of gas discharge ports 211*d*.

The inflator 211 is held by two brackets 212 attached to the great diameter portion 211*a*, and is mounted on the seat frame 203 together with the airbag 215. Each of the brackets 212 includes an annular clamp 212*a* made of sheet metal for holding the great diameter portion 211*a*, and a bolt 212*b* fixed to the clamp 212*a*. By fastening the bolt 212*b* into nut 213, the bracket 212 mounts the inflator 211 held by the clamp 212*a* to the seat frame 203.

Figure 27:
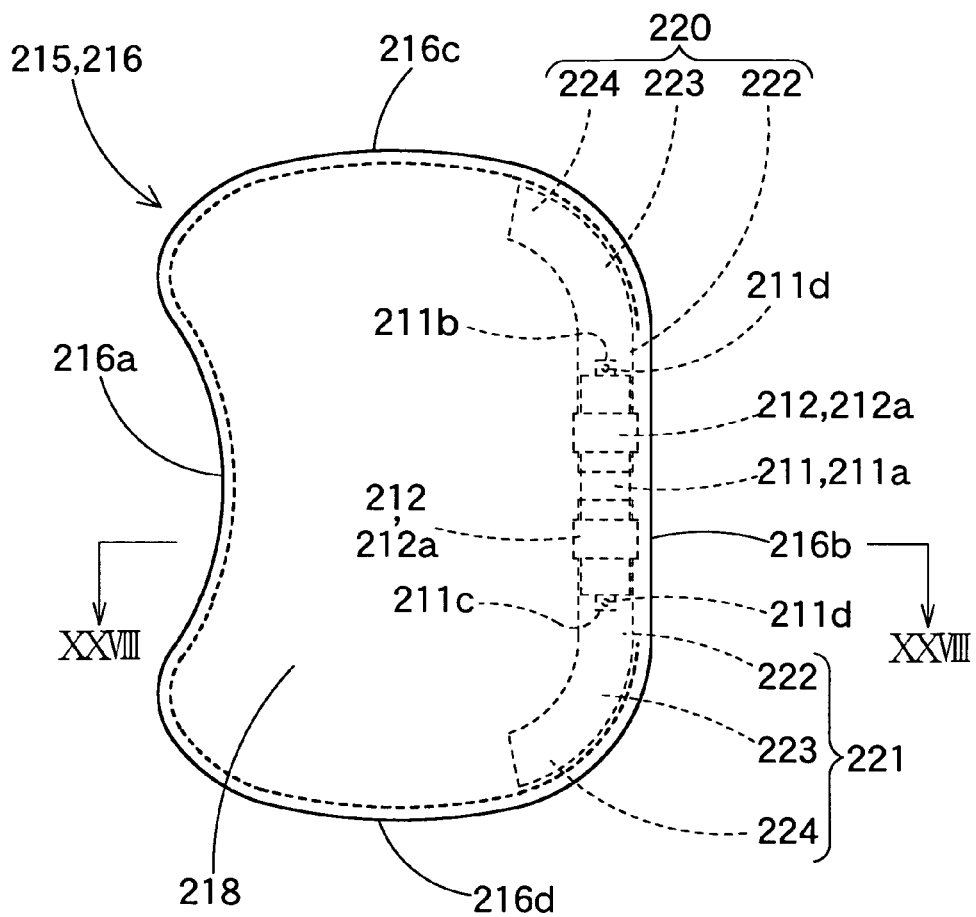
FIG. 27 is a front view of a developed airbag used in the sixth embodiment, with an inflator put inside.
Figure 28:
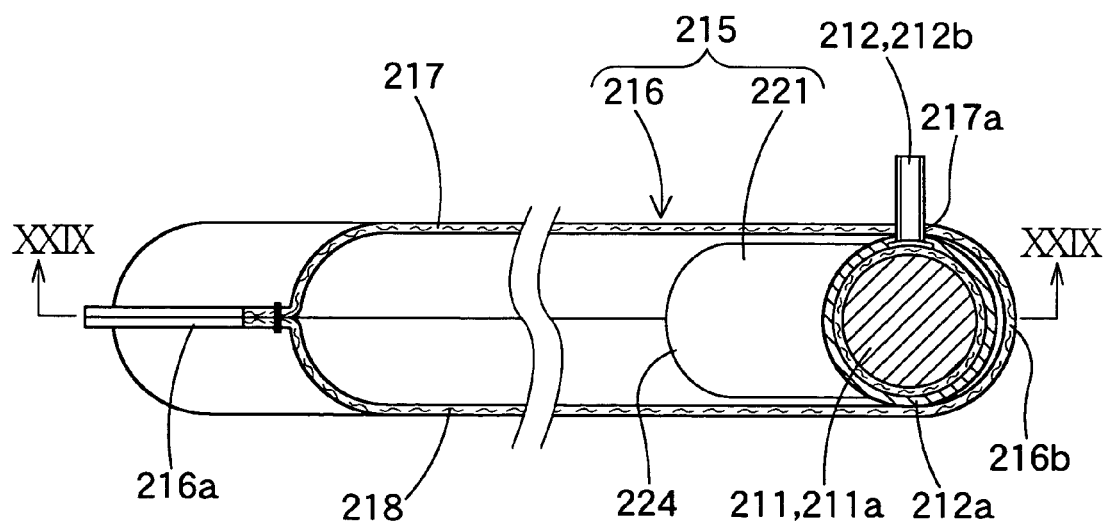
FIG. 28 is a cross section of the airbag of FIG. 27, taken along line XXVIII-XXVIII in FIG. 27.
Figure 29:
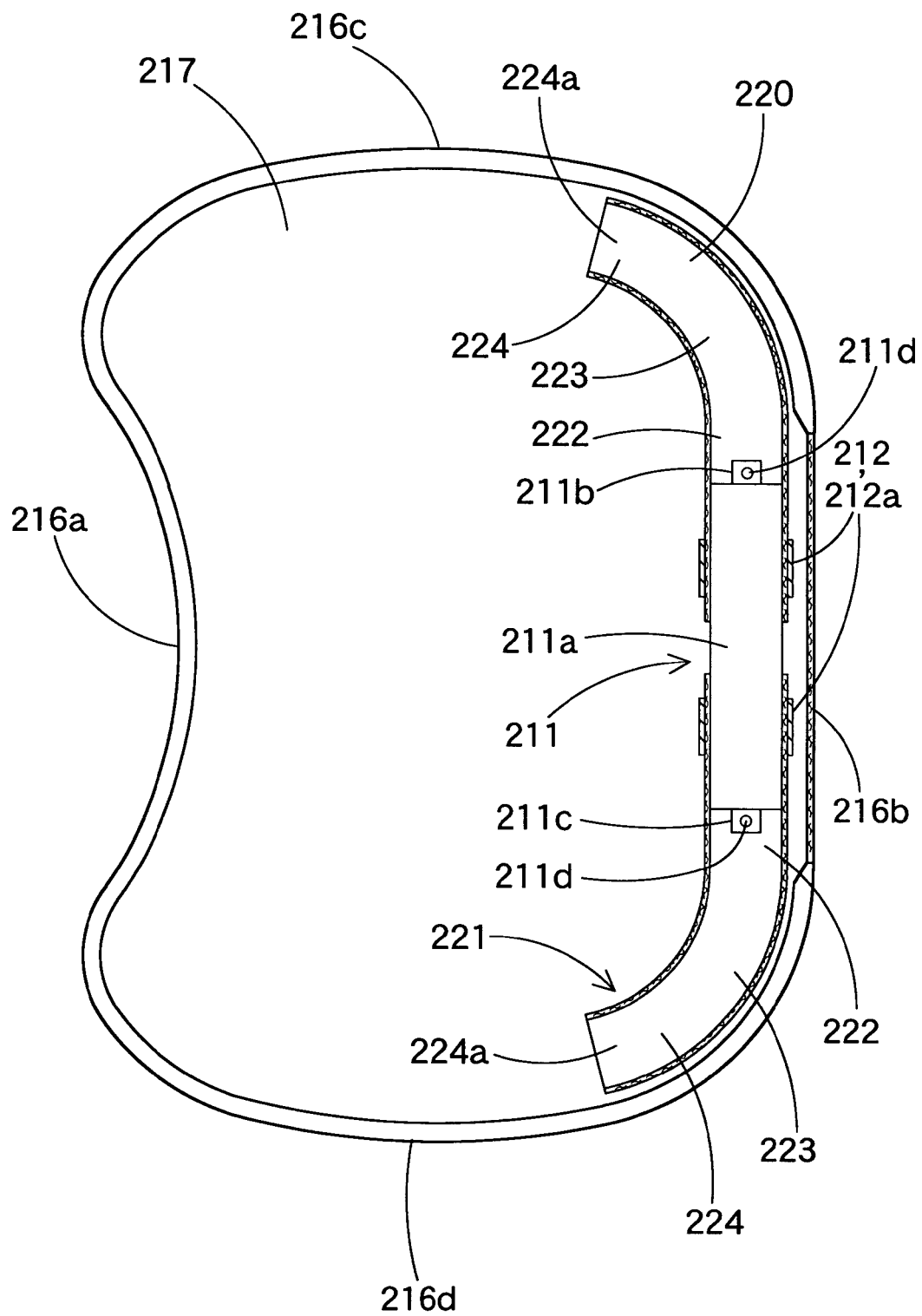
FIG. 29 is a vertical section of the airbag of FIG. 27, taken along line XXIX-XXIX in FIG. 28.

Referring to FIGS. 27 to 29, the airbag 215 includes an airbag body 216 which is inflated into a generally rectangular plate shape, and two cylindrical auxiliary bags 220 and 221. In this embodiment, too, the airbag body 216 and auxiliary bags 220 and 221 are made of flexible woven fabric of synthetic resin or the like such as polyamide.

The airbag body 216 includes an occupant's side wall 217 which is located at side of occupant upon complete inflation, and a body side wall 218 which is located outer side of vehicle confronting the occupant's side wall 217. The airbag body 216 is formed of a single piece of cloth member in which the occupant's side wall 217 and the body side wall 218 are continuous at rear edge 216*b* of the airbag body 216. In other words, the cloth member is folded back on the rear edge 216*b*, and is sewn up at overlapped outer edge, and thus made into the airbag body 216. The occupant's side wall 217 is provided at rear edge 216*b* vicinity with mounting holes 217*a* disposed up and down. The bolts 212*b* of brackets 212 holding the inflator 211 are protruded through the mounting holes 217*a*.

The airbag body 216 is internally provided with unillustrated tethers which join the walls 217 and 218 for keeping the inflated airbag body 216 in a plate shape by regulating clearance between the walls 217 and 218.

Figure 30A:
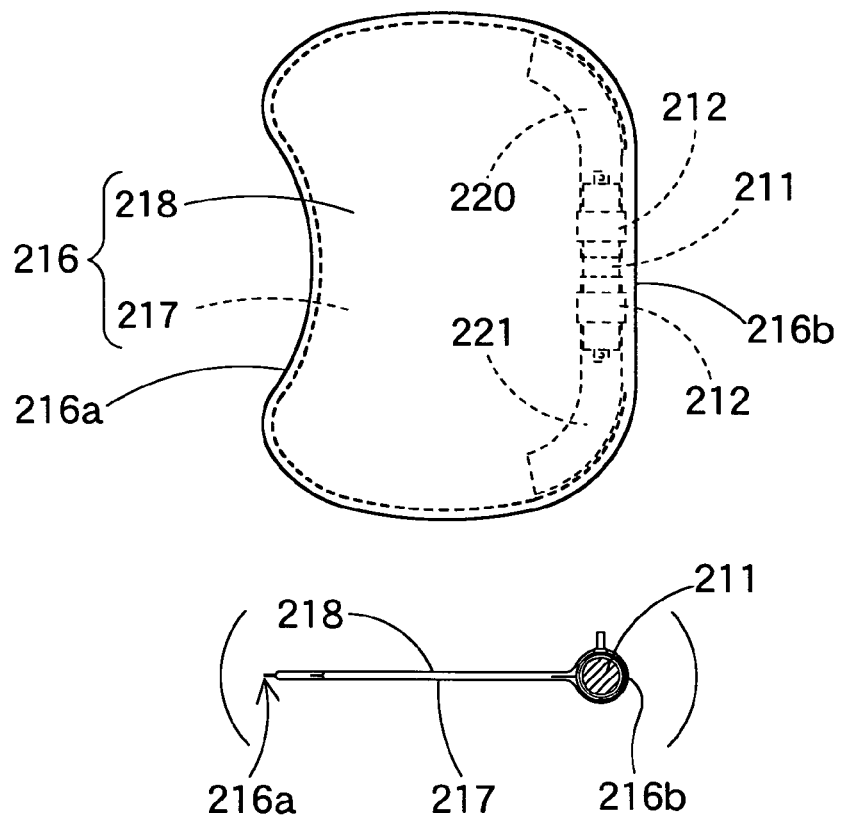
FIGS. 30A, 30B, 31A and 31B illustrate a folding process of the airbag of FIG. 27 in order.
Figure 30B:
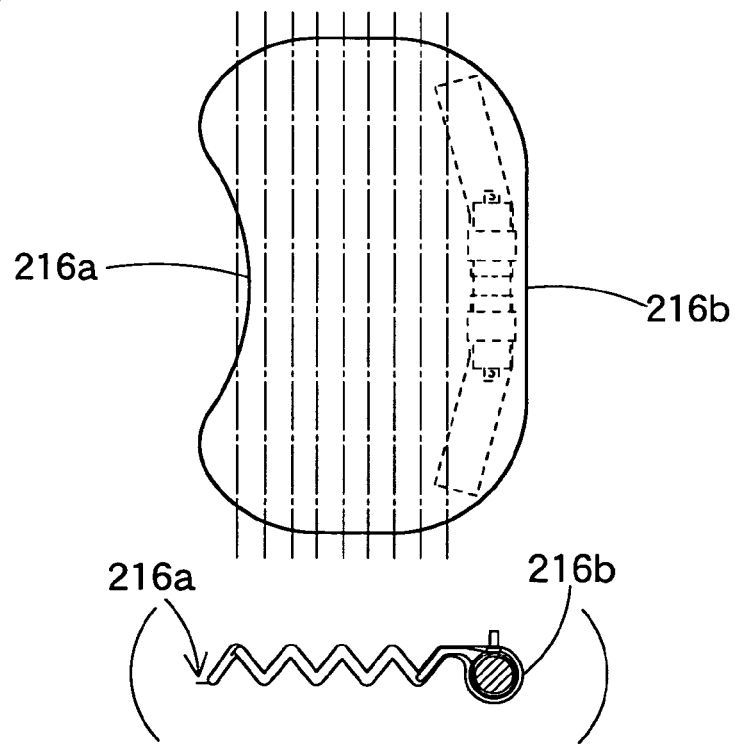
Figure 31:
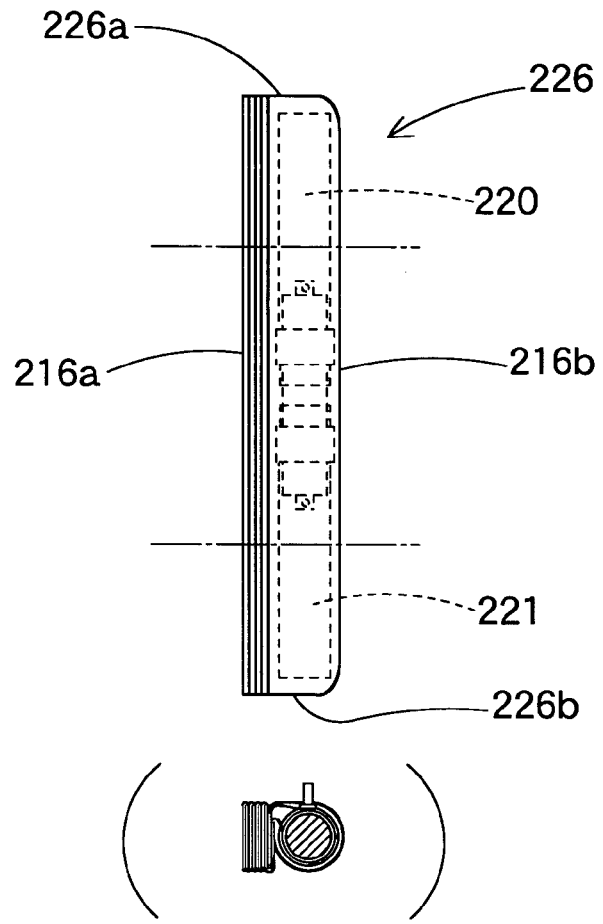
Figure 31:
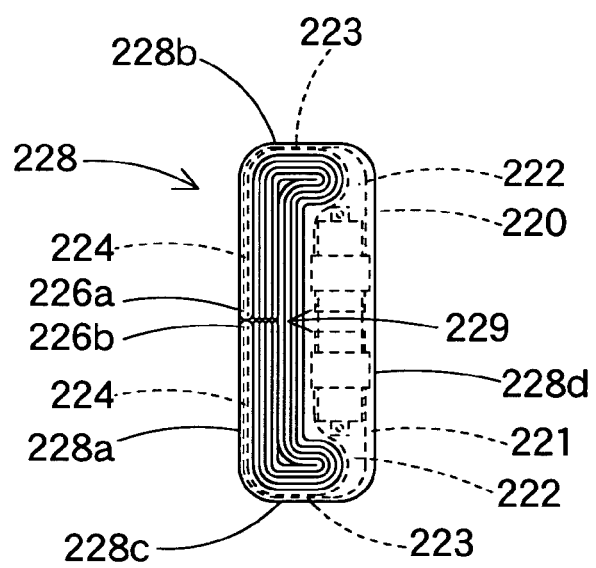

Each of the auxiliary bags 220 and 221 is formed by sewing up confronting edges of a piece of cloth member into a cylindrical shape, as in the first embodiment. Each of the auxiliary bags 220 and 221 is mounted around upper and lower part of the great diameter portion 211*a*, and fastened by the clamp 212*a* of the bracket 212 together with the great diameter portion 211*a*, and thus is held by the great diameter portion 211*a*. Then the auxiliary bags 220 and 221 are put into the airbag body 216 together with the inflator 211. Vertical length of each of the auxiliary bags 220 and 221 is predetermined such that, when the bags 220 and 221 are housed within the airbag body 216 together with the inflator 211, upper/lower end of the bag 220/221 is curved along upper/lower edge 216*c*/216*d* of the airbag body 216 from the rear edge 216*b*, and enters the upper/lower edge part 216*c*/216*d* slightly. Moreover, the vertical length of each of the auxiliary bags 220 and 221 is so predetermined as to extend from upper/lower end face 228*b*/228*c* up to generally vertical center of front end face 228*a* of a folded-up body 228 of and within the airbag body 216, as shown in FIGS. 31A and 31B. The airbag 215 is folded as shown in FIGS. 30A, 30B, 31A and 31B. Firstly, the airbag body 216 is bellows-folded to bring front edge 216*a* close to rear edge 216*b*, and then upper and lower ends 226*a* and 226*b* of bellows-folded body 226 are folded forward.

In each of the auxiliary bags 220 and 221, a portion mounted around the great diameter portion 211*a* of the inflator 211 is an upstream portion 222 of inflation gas, a leading end portion apart from the great diameter portion 211*a* is a downstream portion 224, and a joining portion 223 is a portion that joins the upstream portion 222 and the downstream portion 224 generally straightly. To describe based on the folded-up body 228 of the airbag body 216 shown in FIG. 31B, a portion located in a rear end face 228*d* vicinity is the upstream portion 222, a portion located in a front end face 228a vicinity is the downstream portion 224, and a portion located in upper/lower end face 228b/228c vicinity is the joining portion 223.

Mounting of the side impact airbag device M6 of the sixth embodiment on vehicle is started with manufacturing the airbag 215 with the inflator 211 contained therein. The auxiliary bags 220 and 221 and the brackets 212 are attached to the inflator 211 in advance, by mounting the upstream portions 222 of the bags 220 and 221 around the great diameter portion 211a, and fastening the clamps 212a of the brackets 212 thereon. The airbag 215 is manufactured by folding back a cloth member for the airbag body 216 on to-be rear edge 216b of the airbag body 216, and by sewing up the overlapped outer edge. Before sewing up the outer edge entirely, the inflator 211 with the auxiliary bags 220 and 221 is housed in the airbag body 216, so that the bolts 212b are protruded from the mounting holes 217a of the occupant's sidewall 217. The tethers are attached to the airbag body 216, as well. Unillustrated lead wires extending from the inflator 216 for inputting activation signals are taken out of the airbag 215.

Thereafter, the airbag 215 is folded up. Firstly, as shown in FIGS. 30A, 30B and 31A, the airbag body 216 is bellows-folded to bring the front edge 216a close to the rear edge 216b on folds extending along vertical direction, so that the bellows-folded body 226 is formed. Then as shown in FIGS. 31A and 31B, the upper and lower ends 226a and 226b of the bellows-folded body 226 are so folded back as to wrap the front edge 216a of the airbag body 216 from front side. Thus the folded-up body 228 is complete. At this time, in the upper and lower auxiliary bags 220 and 221, the upstream portions 222 are located in the rear end face 228d proximate to outer surface of the folded-up body 228, the joining portions 223 are located in the upper and lower end faces 228b and 228c, the downstream portion 224 of the upper auxiliary bag 220 is located in an upper front end face 228a, and the downstream portion 224 of the lower auxiliary bag 221 is located in a lower front end face 228a. The folded-up body 228 thus formed is wrapped by unillustrated breakable wrapping member for keeping the folded-up configuration. The bolts 212b of the brackets 212 and the lead wires of the inflator 211 for inputting activation signals are taken out of the wrapping member.

Thereafter, the airbag device M6 is attached to the back rest 202 of the seat 201 by fixing of the bolts 212b to the seat frame 203 with nut 213. Then the cushion 204 and the surface skins 205 and 206 are attached to the back rest 202 to finish the seat 201. Subsequently, the seat 201 is mounted on vehicle, and the lead wires extending from the inflator 211 are connected to an unillustrated activating circuit, so that the airbag device M6 is mounted on vehicle.

Thereafter, when inflation gas G is discharged from the upper and lower gas discharge ports 211d in response to activating signals inputted to the inflator 211, the airbag 215 starts to inflate. The airbag 215 breaks the wrapping member, and then breaks the breakable portion 208c. Then the door 208a of the airbag cover 208 is pushed and opened, and the airbag 215 deploys via the opening 209 provided by the opening of the door 208a.

Figure 32:
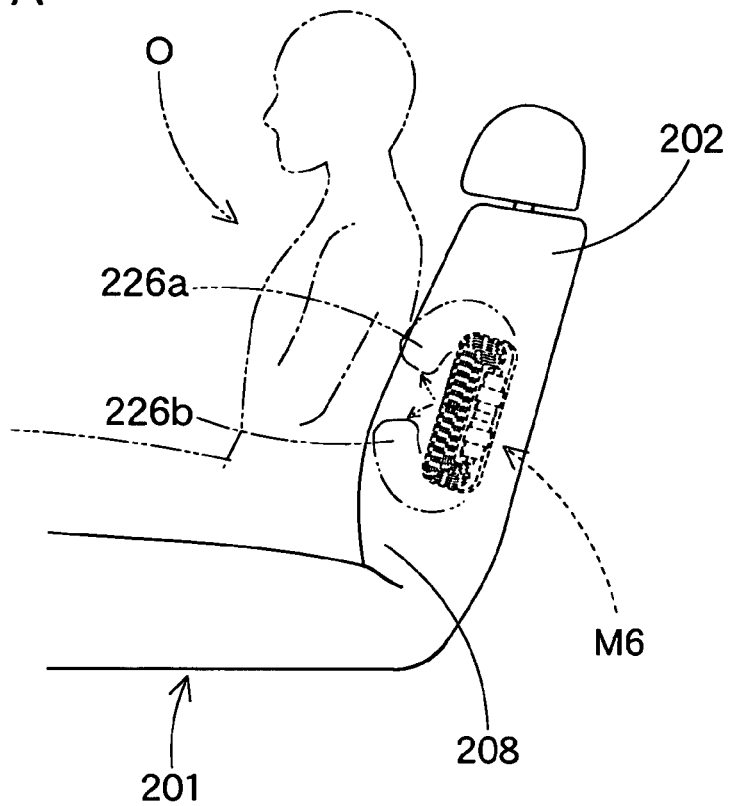
FIGS. 32A, 32B, 33A and 33B illustrate behaviors of the airbag device of FIG. 26 in service in order.
Figure 32:
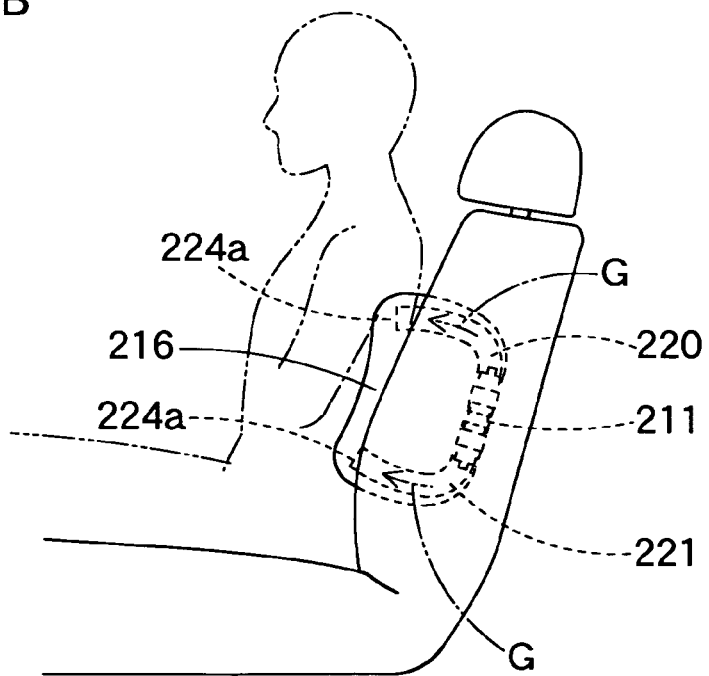
Figure 33:
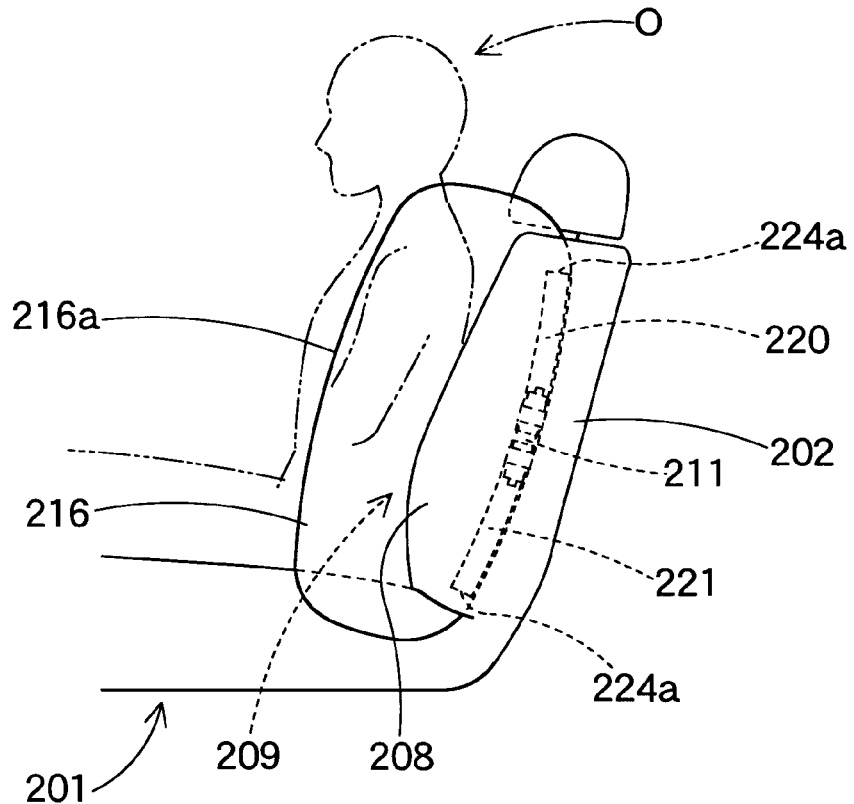
Figure 33:
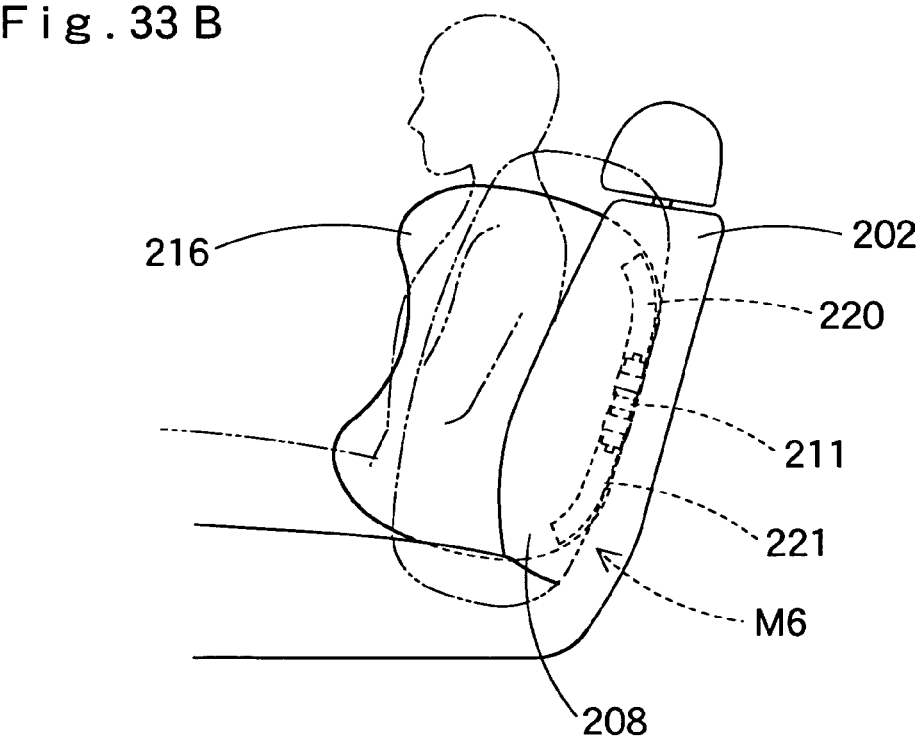

In the sixth embodiment, when inflation gas G is discharged from the upper and lower gas discharge ports 211d, inflation gas G flows instantly from the upstream portion 222 of each of the auxiliary bags 220 and 221 disposed in upper and lower positions of the inflator 211 to the downstream portion 224, which is located proximate to the front end face 228a of the folded-up airbag body 216, via the joining portion 223 located proximate to the upper/lower end face 228b/228c, without being interfered with by folds of a fold mass 229 of the airbag 228. Then each of the auxiliary bags 220 and 221 which was bent in L-shape rotates the downstream portion 224 and the joining portion 223 around upper/lower part of the inflator 211, so that the bag 220/211 inflates in a rod shape extending vertically from the inflator 211. At this time, as shown in FIGS. 32A, 32B and 33A, the airbag 215 quickly opens the door 208a of the airbag cover 208, and the front edge 216a of the airbag body 216 which was bellows-folded to the rear edge 216b is pulled out forward from the opening 209. Accordingly, the airbag body 216 deploys a part of the front edge 216a swiftly at vehicle's outer side of the occupant O while suppressing internal pressure in the initial stage of inflation. Moreover, with inflation gas G flowing out of openings 224a of the downstream portions of the upper and lower auxiliary bags 220 and 221, the airbag body 216 smoothly protrudes forward while unfolding entirely, and completes development and inflation at side of the occupant O.

Especially, the upper and lower auxiliary bags 220 and 221 are disposed to encircle the airbag body 216 within the airbag body 216, from the rear end face 228d of the folded airbag body 216 to the front end face 228a via the upper and lower end faces 228b and 228c. That is, although the airbag body 216 is compactly folded up with its up-down and front-rear dimensions reduced and housed in the backrest 202, the auxiliary bags 220 and 221 help develop and inflate the airbag body 216 swiftly.

What is claimed is:

1. An airbag device for front passenger's seat comprising an airbag protruding from an opening for protrusion in instrument panel and deploying toward front passenger's seat when fed with inflation gas; wherein:

the airbag comprises:
 a bag-shaped airbag body constituting outer wall of the airbag; and
 a flow regulating cloth located upstream of inflation gas inside the airbag body, the cloth inflating firstly upon inflow of inflation gas, and redirecting the gas before supplying the same to the airbag body for promoting deployment of the airbag body;
the flow regulating cloth comprises a pipe-shaped circumferential wall and substantially only two gas outlet ports that are disposed on left and right ends of the circumferential wall,
part of the circumferential wall of the left and right outlet ports are configured to extend in a left-right direction from the opening for protrusion in a pipe-shape such that the gas outlet ports are oriented horizontally;
a left-right length of the flow regulating cloth in a left-right direction is greater than a width of the opening on the instrument panel in the left-right direction;
the flow regulating cloth includes a gas inlet port located at a generally transverse center of an underside of the circumferential wall, and an upper end portion that is located opposite from the gas inlet port between the left and right outlet ports configured to be deployed above a top face of the instrument panel upon airbag deployment;
when the airbag is in a folded-up states an area of the circumferential wall from the gas inlet port to the upper end portion is located in between front and rear fold masses of the airbag body without being folded into folds of the fold masses; and when the airbag is in a flattened state, the upper end portion is laid out between top faces of the front and rear fold masses and an outer wall of the airbag body; and when the airbag is inflated, parts of the circumferential wall of the left and right outlet ports project from the opening in the instrument panel in the left-right direction, such that the parts run on the top face of the instrument panel at least in left and right periphery of the opening.

2. The airbag device for front passenger's seat according to claim 1, wherein inner diameter of the flow regulating cloth in the vicinity of the inlet port is greater than that in the vicinity of the left and fight outlet ports.

3. The airbag device for front passenger's seat according to claim 1, wherein the flow regulating cloth comprises:
   a pipe-shaped surface side portion provided with the left and right gas outlet ports in left and right ends thereof, the surface side portion being disposed above top face of the instrument panel upon inflation of the airbag; and
   a pipe-shaped inlet side portion for admitting inflation gas, the inlet side portion being perpendicularly communicated with the surface side portion at generally transverse center of a circumferential wall of the surface side portion.

4. The airbag device for front passenger's seat according to claim 1, wherein:
   in the flow regulating cloth, each of projecting lengths in left-right direction of the leading end parts of the circumferential wall of the left and right outlet ports projected above the top face of the instrument panel is such a length that does not allow end faces of the circumferential wall of the left and right outlet ports to abut against an inner surface of the completely inflated airbag body; and
   the length is ⅕ of transverse width of the opening for protrusion in the instrument panel or longer.

5. The airbag device for front passenger's seat according to claim 1, wherein:
   when the airbag is completely inflated;
   a portion of the flow regulating cloth confronting the gas inlet port is disposed above top face of the instrument panel; and
   the flow regulating cloth has, provided that height from the inlet port to the opening for protrusion is $H0$, and that height from the inlet port to the portion confronting the inlet port is $H1$, such inner diameter that relationship between $H0$ and $H1$ is $H0 < H1 < 3 \times H0$.

* * * * *